United States Patent [19]
Suzuki

[11] Patent Number: 5,897,601
[45] Date of Patent: Apr. 27, 1999

[54] VEHICLE CONTROL SYSTEM HAVING DIFFERENTIAL CONTROL DEVICE AND WHEEL ROTATION CONTROL DEVICE CONTROLLED IN RELATION TO EACH OTHER

[75] Inventor: Tomokiyo Suzuki, Toyota, Japan

[73] Assignee: Toyota Jidosha Kabushiki Kaisha, Toyota, Japan

[21] Appl. No.: 08/690,961

[22] Filed: Aug. 1, 1996

[30] Foreign Application Priority Data

Nov. 16, 1995 [JP] Japan .................. 7-298063

[51] Int. Cl.[6] .................. G06F 7/00; G06F 17/00
[52] U.S. Cl. .................. 701/78; 701/88
[58] Field of Search .................. 701/69, 74, 78, 701/81–83, 84, 88; 180/247, 248, 249; 477/35–36, 61; 475/86, 88–90

[56] References Cited

U.S. PATENT DOCUMENTS

| | | | |
|---|---|---|---|
| 5,033,329 | 7/1991 | Tezuka | 701/69 |
| 5,036,940 | 8/1991 | Takemura | 180/249 |
| 5,117,937 | 6/1992 | Namioka | 180/248 |
| 5,168,953 | 12/1992 | Naito | 701/88 |
| 5,172,787 | 12/1992 | Kobayashi | 701/88 |
| 5,366,041 | 11/1994 | Shiraishi et al. | 701/81 |

FOREIGN PATENT DOCUMENTS 6-297975   10/1994   Japan .

Primary Examiner—Jacques H. Louis-Jacques
Assistant Examiner—Gertrude Arthur
Attorney, Agent, or Firm—Kenyon & Kenyon

[57] ABSTRACT

A motor vehicle control system including a differential for connecting vehicle wheels so as to permit differential actions of the wheels, a differential control device for controlling the differential, and a wheel rotation control device for controlling the rotation of the wheels, wherein the differential control device has an operator-controlled member whose output indicates a vehicle operator's desire, a vehicle condition detector for detecting the vehicle condition, a differential actuator for operating the differential so as to control the differential actions of the wheels, and a differential controller for controlling the actuator based on the outputs of the operator-controlled member and the vehicle condition detector, the system having a differential state detector whose output indicates the operating state of the differential, and a wheel rotation control determining device operated on the basis of the outputs of the operator-controlled member, differential state detector and vehicle condition detedtor, for determining whether a normal operation of the rotation control device should be permitted or inhibited.

26 Claims, 16 Drawing Sheets

FIG. 5

| SELECTOR SWITCH 110 | | TRANSFER 60 | | | |
|---|---|---|---|---|---|
| | | H2 | H4 | H4 | L4 |
| | | | 1ST CONTROL STATE: "FREE" | | |
| OFF | DIFFERENTIAL 56 | OFF | | | |
| | LIGHT 134 | PERMITTED | | | |
| | ANTI-LOCK CONTROL | | | | |
| | | | 2ND CONTROL STATE: "FREE" ("LOCK INHIBIT") | | |
| ON | DIFFERENTIAL 56 | FLICKERING | | | |
| | LIGHT 134 | | | | |
| | ANTI-LOCK CONTROL | PERMITTED | | | |

| VEHICLE SPEED | | 3RD CONTROL STATE: "FREE" ("LOCK INHIBIT") | 4TH CONTROL STATE: "LOCK" |
|---|---|---|---|
| HIGH | DIFFERENTIAL 56 | FLICKERING | ON |
| | LIGHT 134 | PERMITTED HIGH↓LOW | INHIBITED HIGH↑LOW |
| | ANTI-LOCK CONTROL | | |
| | | 5TH CONTROL STATE: "LOCK" | |
| LOW | DIFFERENTIAL 56 | ON | |
| | LIGHT 134 | | |
| | ANTI-LOCK CONTROL | INHIBITED | |

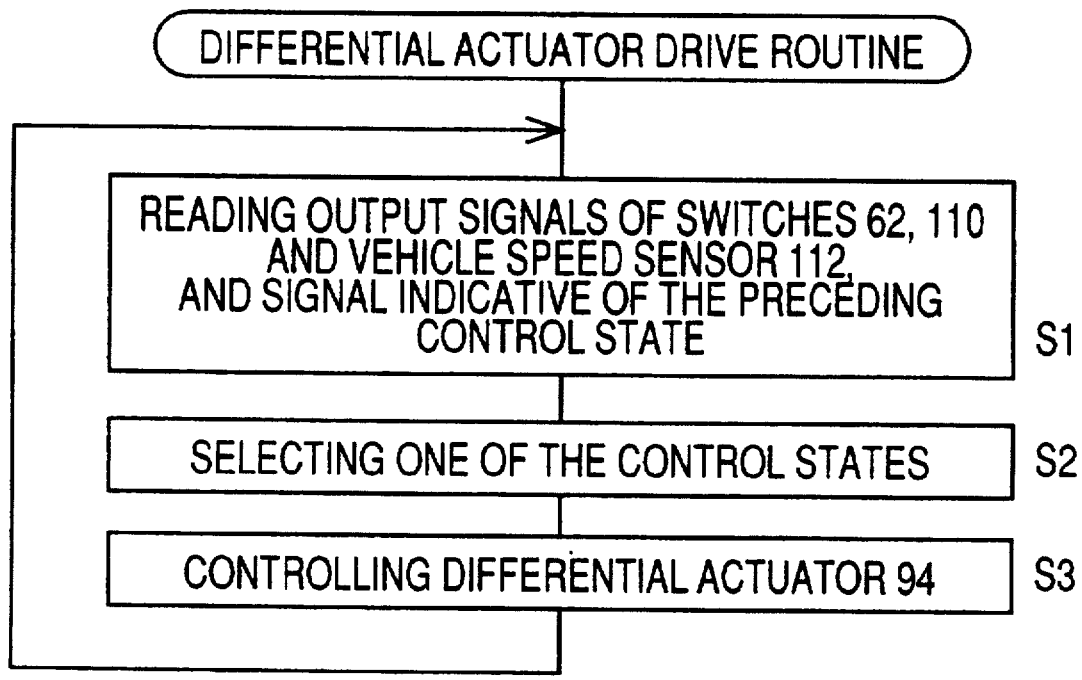

FIG.7

| No. | INPUTS | TRANSISTOR 148 | LIGHT 134 |
|---|---|---|---|
| 1 | SWITCH 110 OFF  NORMAL → | HELD OFF WITH HIGH MONITOR VOLTAGE | HELD OFF WITH HIGH MONITOR VOLTAGE |
| 2 | SWITCH 110 ON  NORMAL → AND SWITCH 62 OFF | HELD OFF WITH LOW MONITOR VOLTAGE | HELD ON WITH LOW MONITOR VOLTAGE |
| 3 | SWITCHES 110 AND 62 ON, NORMAL → AND HIGH VEHICLE SPEED AFTER 1ST, 2ND OR 3RD CONTROL STATE | ALTERNATELY ON AND OFF WITH HIGH MONITOR VOLTAGE | FLICKERLING WITH HIGH MONITOR VOLTAGE |
| | | HELD OFF WITH LOW MONITOR VOLTAGE | HELD ON WITH LOW MONITOR VOLTAGE |
| 4 | SWITCHES 110 AND 62 ON, AND HIGH VEHICLE SPEED AFTER 4TH OR 5TH CONTROL STATE  NORMAL → | ALTERNATELY ON AND OFF WITH HIGH MONITOR VOLTAGE | FLICKERLING WITH HIGH MONITOR VOLTAGE |
| | | HELD OFF WITH LOW MONITOR VOLTAGE | HELD ON WITH LOW MONITOR VOLTAGE |
| 5 | SWITCHES 110 AND 62 ON, AND LOW VEHICLE SPEED  NORMAL → | ALTERNATELY ON AND OFF WITH HIGH MONITOR VOLTAGE | FLICKERLING WITH HIGH MONITOR VOLTAGE |
| | | HELD OFF WITH LOW MONITOR VOLTAGE | HELD ON WITH LOW MONITOR VOLTAGE |

FIG. 8

| VOLTAGE SIGNAL | DETERMINATION STANDARD | |
|---|---|---|
| | FIRST STANDARD<br>PERMITTED WITH HIGH VOLTAGE FOR 0.7s OR LONGER, AND INHIBITED WITH LOW VOLTAGE FOR 0.2s OR LONGER | SECOND STANDARD<br>PERMITTED WITH HIGH VOLTAGE FOR 0.2s OR LONGER, AND INHIBITED WITH LOW VOLTAGE FOR 0.7s OR LONGER |
| HIGH / LOW | PERMITTED | PERMITTED |
| HIGH / LOW (0.5s, 0.5s) | INHIBITED | PERMITTED |
| HIGH / LOW | INHIBITED | INHIBITED |

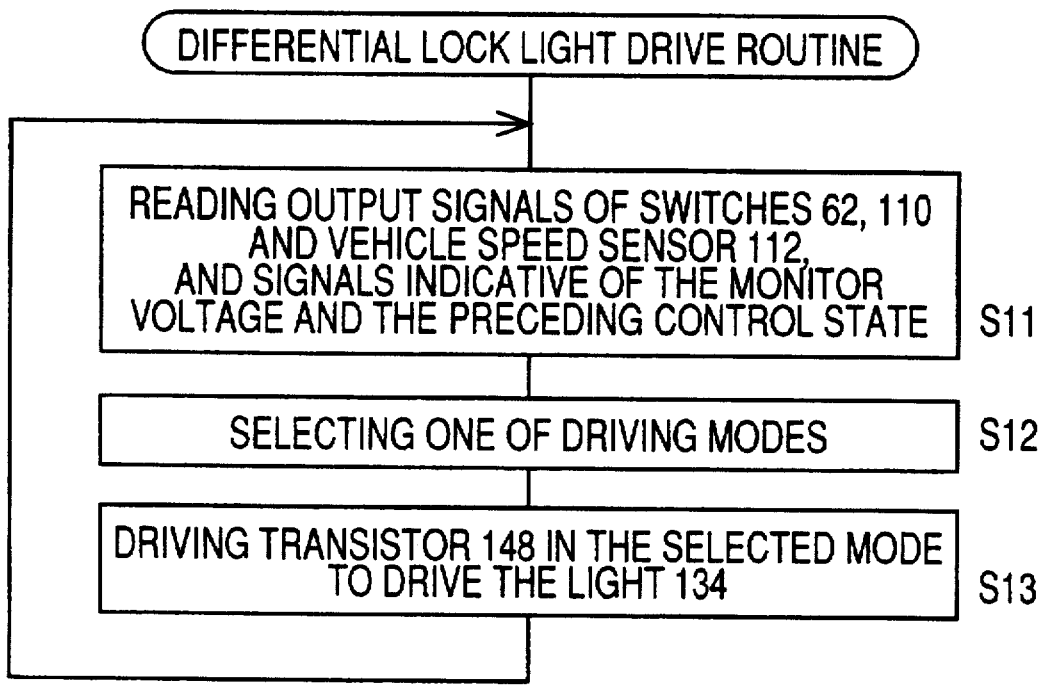

FIG. 10

| No. | INPUTS | TRANSISTOR 148 | LIGHT 134 |
|---|---|---|---|
| 1 | SWITCH 110 OFF — NORMAL | HELD OFF WITH HIGH MONITOR VOLTAGE | HELD OFF WITH HIGH MONITOR VOLTAGE |
| 2 | SWITCH 110 ON AND SWITCH 62 OFF — NORMAL | HELD OFF WITH LOW MONITOR VOLTAGE | HELD ON WITH LOW MONITOR VOLTAGE |
| | | ALTERNATELY ON (0.2s) AND OFF (1.1s) WITH HIGH MONITOR VOLTAGE | FLICKERLING (ON: 0.2s, OFF: 1.1s) WITH HIGH MONITOR VOLTAGE |
| | | HELD OFF WITH LOW MONITOR VOLTAGE | HELD ON WITH LOW MONITOR VOLTAGE |
| 3 | SWITCHES 110 AND 62 ON, AND HIGH VEHICLE SPEED AFTER 1ST, 2ND OR 3RD CONTROL STATE — NORMAL | ALTERNATELY ON (0.2s) AND OFF (1.1s) WITH HIGH MONITOR VOLTAGE | FLICKERLING (ON: 0.2s, OFF: 1.1s) WITH HIGH MONITOR VOLTAGE |
| | | HELD OFF WITH LOW MONITOR VOLTAGE | HELD ON WITH LOW MONITOR VOLTAGE |
| 4 | SWITCHES 110 AND 62 ON, AND HIGH VEHICLE SPEED AFTER 4TH OR 5TH CONTROL STATE — NORMAL | ALTERNATELY ON (0.7s) AND OFF (0.3s) WITH HIGH MONITOR VOLTAGE | FLICKERLING (ON: 0.7s, OFF: 0.3s) WITH HIGH MONITOR VOLTAGE |
| | | HELD OFF WITH LOW MONITOR VOLTAGE | HELD ON WITH LOW MONITOR VOLTAGE |
| 5 | SWITCHES 110 AND 62 ON, AND LOW VEHICLE SPEED — NORMAL | ALTERNATELY ON (0.7s) AND OFF (0.3s) WITH HIGH MONITOR VOLTAGE | FLICKERLING (ON: 0.7s, OFF: 0.3s) WITH HIGH MONITOR VOLTAGE |
| | | HELD OFF WITH LOW MONITOR VOLTAGE | HELD ON WITH LOW MONITOR VOLTAGE |

FIG. 11

| | | TRANSFER 60 | | | |
|---|---|---|---|---|---|
| | | H2 | H4 | | L4 |
| SELECTOR SWITCH 110 | OFF | 1ST CONTROL STATE: "FREE" | | | |
| | | DIFFERENTIAL 56 | OFF | | |
| | | LIGHT 134 | HIGH | | |
| | | INPUT VOLTAGE | | | |
| | | ANTI-LOCK CONTROL | PERMITTED | | |
| | ON | 2ND CONTROL STATE: "FREE" AND "LOCK INHIBIT" | | 3RD CONTROL STATE: "FREE" AND "LOCK INHIBIT" | |
| | | DIFFERENTIAL 56 | ON (0.2s) ↔ OFF (1.1s) | ON (0.2s) ↔ OFF (1.1s) | |
| | | LIGHT 134 | LOW (0.2s) ↔ HIGH (1.1s) | LOW (0.2s) ↔ HIGH (1.1s) | |
| | | INPUT VOLTAGE | | PERMITTED HIGH ↓ LOW | |
| | | ANTI-LOCK CONTROL | PERMITTED | | |

| | | 4TH CONTROL STATE: "LOCK" | 5TH CONTROL STATE: "LOCK" |
|---|---|---|---|
| VEHICLE SPEED | HIGH | DIFFERENTIAL 56 | ON |
| | | LIGHT 134 | LOW |
| | | INPUT VOLTAGE | INHIBITED HIGH ↓ LOW |
| | | ANTI-LOCK CONTROL | |
| | LOW | DIFFERENTIAL 56 | ON |
| | | LIGHT 134 | LOW |
| | | INPUT VOLTAGE | |
| | | ANTI-LOCK CONTROL | INHIBITED |

FIG. 15

| VOLTAGE SIGNAL | DETERMINATION STANDARD |
|---|---|
| | PERMITTED WITH HIGH VOLTAGE FOR 0.5s OR LONGER, AND INHIBITED WITH LOW VOLTAGE FOR 0.3s OR LONGER |
| HIGH / LOW (rising edge) | PERMITTED |
| HIGH / LOW (0.2s low, 1.1s high) | PERMITTED |
| HIGH / LOW (0.7s high, 0.3s low pulse) | INHIBITED |
| HIGH / LOW (falling edge) | INHIBITED |

FIG. 16

| | | DIFFERENTIAL LOCK DETECTOR SWITCH 142 OFF | |
|---|---|---|---|
| | | OFF | ON |
| LINE DISCONNECTION | SWITCH 110 | OFF | OFF ←→ ON |
| NO DISCONNECTION | TRANSISTOR 248 | OFF | ON (0.7s) ←→ OFF (0.3s) |
| | LIGHT 134 | HIGH | LOW (0.7s) ←→ HIGH (0.3s) |
| | MONI. VOLTAGE | PERMITTED | INHIBITED |
| | ANTI-LOCK CONTROL | | |
| DISCONNECTED AT P1 | LIGHT 134 | OFF | OFF |
| | MONI. VOLTAGE | LOW | LOW |
| | ANTI-LOCK CONTROL | INHIBITED | INHIBITED |
| DISCONNECTED AT P2 | LIGHT 134 | OFF | ON (0.7s) ←→ OFF (0.3s) |
| | MONI. VOLTAGE | LOW | LOW |
| | ANTI-LOCK CONTROL | INHIBITED | INHIBITED |
| DISCONNECTED AT P3 | LIGHT 134 | OFF | ON (0.7s) ←→ OFF (0.3s) |
| | MONI. VOLTAGE | HIGH | LOW (0.7s) ←→ HIGH (0.3s) |
| | ANTI-LOCK CONTROL | PERMITTED | INHIBITED |
| DISCONNECTED AT P4 | LIGHT 134 | OFF | ON (0.7s) ←→ OFF (0.3s) |
| | MONI. VOLTAGE | LOW | LOW |
| | ANTI-LOCK CONTROL | INHIBITED | INHIBITED |
| DISCONNECTED AT P5 | LIGHT 134 | OFF | OFF |
| | MONI. VOLTAGE | HIGH | HIGH |
| | ANTI-LOCK CONTROL | PERMITTED | PERMITTED |

FIG. 17

| LINE DISCONNECTION | | DIFFERENTIAL LOCK DETECTOR SWITCH 142 | |
|---|---|---|---|
| | | ON | OFF |
| NO DISCONNECTION | SWITCH 110 | ON | OFF |
| | TRANSISTOR 248 | OFF | OFF |
| DISCONNECTED AT P1 | LIGHT 134 | ON | ON |
| | MONI. VOLTAGE | LOW | LOW |
| | ANTI-LOCK CONTROL | INHIBITED | INHIBITED |
| DISCONNECTED AT P2 | LIGHT 134 | OFF | OFF |
| | MONI. VOLTAGE | LOW | LOW |
| | ANTI-LOCK CONTROL | INHIBITED | INHIBITED |
| DISCONNECTED AT P3 | LIGHT 134 | OFF | OFF |
| | MONI. VOLTAGE | LOW | LOW |
| | ANTI-LOCK CONTROL | INHIBITED | INHIBITED |
| DISCONNECTED AT P4 | LIGHT 134 | ON (0.7s) → OFF (0.3s) | ON |
| | MONI. VOLTAGE | LOW (0.7s) → HIGH (0.3s) | HIGH |
| | ANTI-LOCK CONTROL | INHIBITED | PERMITTED |
| DISCONNECTED AT P5 | LIGHT 134 | ON | ON |
| | MONI. VOLTAGE | LOW | LOW |
| | ANTI-LOCK CONTROL | INHIBITED | INHIBITED |
| | LIGHT 134 | ON | ON |
| | MONI. VOLTAGE | LOW | LOW |
| | ANTI-LOCK CONTROL | INHIBITED | INHIBITED |

VEHICLE CONTROL SYSTEM HAVING DIFFERENTIAL CONTROL DEVICE AND WHEEL ROTATION CONTROL DEVICE CONTROLLED IN RELATION TO EACH OTHER

BACKGROUND OF THE INVENTION

Field of the Invention

The present invention relates in general to a motor vehicle control system including a differential control device for controlling the operating state of a differential gear associated with a plurality of wheels of the vehicle, and a wheel rotation control device for controlling the rotating state of the wheels. More particularly, the invention is concerned with techniques for correct determination as to whether an operation of the wheel rotation control device should be permitted or inhibited, depending upon the operating state of the differential gear or differential control device.

Discussion of the Related Art

JP-A-6-297975 disclosed an example of such motor vehicle control system including both a differential control device and a wheel rotation control device.

Generally, the differential control device includes (a) a differential actuator for operating a differential connected to a plurality of wheels of the vehicle, and (b) a differential controller for controlling the differential actuator to operate the differential for thereby controlling the differential actions of the wheels.

The differential control device may be adapted to selectively place the differential in one of a LOCK state in which the differential actions of the wheels are substantially inhibited, and a FREE state in which the differential actions are substantially permitted. The differential control device may include operator-controlled input means which is operated to select the FREE or LOCK state of the differential, so that the differential control device operates to selectively place the differential in the FREE or LOCK state.

On the other hand, the wheel rotation control device generally includes (a) slip detecting means for detecting an amount relating to slipping of the wheels, (b) an actuator (e.g., hydraulic pressure control device electrically operated to regulate braking pressure applied to each wheel) for controlling the rotating state of the wheel, and (c) a controller for controlling the actuator to control the rotating state of the wheel, according to an output of the slip detecting means.

The above-identified publication JP-A-6-297975 shows an example of the wheel rotation control device in the form of an anti-lock brake pressure control device, which is adapted to control a braking torque of the wheel so as to prevent locking of the wheel during brake application to the vehicle. For example, the braking torque may be controlled by regulating the hydraulic braking pressure to be applied to the wheel. Other examples of the wheel rotation control device include a traction control device and a yaw moment control device. The traction control device is arranged to control a driving torque of each drive wheel of the vehicle so as to prevent spinning or slipping of the drive wheels. For instance, the driving torque of the drive wheel may be controlled by controlling the operating speed of a vehicle engine or by regulating the hydraulic braking pressure to be applied to the drive wheel. The yaw moment control device is adapted to brake right and left wheels of the vehicle such that the braking forces acting on the right and left wheels are made different from each other to thereby control a yaw moment of the vehicle for stabilizing the attitude of the running vehicle.

On some motor vehicles, brake application is effected while the differential actions between front and rear wheels are substantially restricted or inhibited. In this case, the rotating states of the front wheels and those of the rear wheels may not be controlled independently of each other, whereby the wheel rotation control device may fail to correctly control the rotating states of both of the front and rear wheels. Where brake application is effected while the differential actions between right and left wheels are substantially restricted or inhibited, the rotating states of the right and left wheels may not be controlled independently of each other, whereby the wheel rotation control device may fail to correctly control the rotating states of both of the right and left wheels. However, there is a strong need for correct control of the rotating states of the right and left rear wheels by the wheel rotation control device, during brake application on an uneven friction-coefficient road surface whose right and left areas have different friction coefficient values, particularly where the brake application is effected while not only the differential actions between the front and rear wheels but also the differential actions between the right and left wheels are substantially inhibited. In this respect, it is noted that the right and left rear wheels generally contribute to improved running stability of the vehicle during brake application to a greater extent than the front wheels.

In the light of the above drawback, the above-identified publication proposes techniques for preventing abnormal operation of the anti-lock brake pressure control device in the case where the differential control device and the anti-lock brake pressure control device are concurrently operated for the front and rear wheels, more particularly, techniques for reducing a target value of the amount of restriction of the differential actions of the front and rear wheels by the differential control device in the above case, so that the anti-lock brake pressure control device is operated in the normal manner while the differential is placed in a state in which the differential actions of the front and rear wheels are permitted to a greater extent in the above case. The same publication also discloses techniques for totally or partially disabling the anti-lock brake pressure control device in the case where the amount of restriction of the differential actions cannot be reduced due to some defect in the differential control device.

The present inventor developed a differential control device of the type described below. This differential control device includes the differential actuator and controller discussed above, and further includes operator-controlled input means and vehicle condition detecting means, so that the controller receives an output signal of the input means indicating the vehicle operator's desire to place the differential in the LOCK state, and an output signal of the vehicle condition detecting means indicative of the running condition of the vehicle. The controller is adapted to automatically inhibit the differential from being placed in the LOCK state even when the operator-controlled input means has been operated to place the differential in the LOCK state, if the vehicle is in a predetermined running condition. In this respect, it is noted that the stability of turning of the vehicle at a relatively high speed is lowered when the differential is placed in the LOCK state. In this sense, it is desirable that the operation of the differential to establish the LOCK state be effected only when the vehicle running speed is relatively low. The controller may be arranged to automatically inhibit the differential from being placed in the LOCK state if the vehicle operator has operated the input means to establish the LOCK state during running of the vehicle at a relatively high speed. This arrangement assures improved turning stability of the vehicle at a high speed without the differential being placed in the LOCK state.

Thus, the differential control device developed by the present inventor does not always assure coincidence between the operating state of the differential desired by the operator and the actually established operating state of the differential. Namely, under the predetermined vehicle running condition, the differential control device ignores the operator's intention (i.e., intention to establish the LOCK state) as represented by the output signal of the operator-controlled input means. In the vehicle control system including the wheel rotation control device as well as the differential control device developed by the present inventor, an operation of the wheel rotation control device may be undesirably inhibited even with the differential actually kept in the FREE state, if the operating state of the differential is determined on the basis of the output signal of the operator-controlled input means. However, the wheel rotation control device should be operated if the differential remains in the FREE state because the operator-controlled input means is operated under the predetermined running condition.

In view of the above fact in the vehicle control system including the differential control device and the wheel rotation control device, it is desirable to actually detect the currently established operating state (LOCK or FREE state) of the differential, and effect the determination as to whether the operation of the wheel rotation control device should be permitted or inhibited, depending upon the detected operating state of the differential, so that the wheel rotation control device is operated as long as the differential is placed in the FREE state, irrespective of the operator's intention as represented by the output signal of the input means.

The operating state of the differential as represented by the operator-controlled input means and the actually established operating state do not coincide with each other, in some other instances, for example, in a transient state of the differential, more specifically, during a time period between the moment at which the differential control device receives the output signal of the input means indicative of the operator's intention to establish the LOCK state of the differential, and the moment at which the differential has been actually brought to the LOCK state. The differential cannot be brought to the LOCK state immediately after the generation of the output signal of the input means, and remains in the FREE state for some time even in the presence of the output signal. The detection of the FREE state in this transient state indicates that the differential will be brought to the LOCK state in some time, and therefore the operation of the wheel rotation control device is desirably permitted since the operation of this device is not desirable when the differential is subsequently placed in the LOCK state.

There will be explained in detail one of the reasons why it is desirable to determine that the operation of the wheel rotation control device should be inhibited, when the transient state of the differential is detected.

The vehicle control system may be arranged as described below, for example. That is, the differential control device is designed to place the differential in the LOCK state in response to the output signal of the operator-controlled input means indicative of the operator's intention to establish the LOCK state. On the other hand, the wheel rotation control device is designed to be inhibited from operating when the differential is placed in the LOCK state. Further, the differential control device includes (a) differential detecting means for determining whether the differential is placed in the LOCK state or not, (b) determining means for determining that the operation of the wheel rotation control device should be inhibited, if the differential is placed in the LOCK state, and (c) indicator means for providing an indication that the operation of the wheel rotation control device is inhibited, if the determining means determines that the operation of the wheel rotation control device should be inhibited.

In the vehicle control system designed as described above, the indicator means informs the vehicle operator that the operation of the wheel rotation control device is inhibited, in quick response to the output signal of the operator-controlled input means, if the differential has been brought to the LOCK state in quick response to the output signal. However, the differential may be held in the transient state some time after the generation of the output signal of the input means. In this case, the indicator means does not provide an indication that the operation of the wheel rotation control device is inhibited, in quick response to the operator's operation of the input means, whereby the operator waits for the completion of an operation of the differential control device to place the differential in the LOCK state. That is, the indication that the operation of the wheel rotation control device is inhibited is delayed with respect to the moment at which the input means is operated. However, it is desirable to design the vehicle control device such that the indicator means informs the operator of the disabling of the wheel rotation control device, in quick response to the output signal of the input means, irrespective of whether the differential is actually in the transient state or not.

For the above reason, it is desirable to determine that the operation of the wheel rotation control device should be inhibited, upon detection of the transient state of the differential.

To detect the transient state of the differential with high accuracy, it is required to not only detect the currently established operating state of the differential, but also obtain the subsequent operating state of the differential (currently desired operating state of the differential which will be established).

SUMMARY OF THE INVENTION

It is therefore an object of the present invention to provide a motor vehicle control system which permits accurate determination as to whether the operation of the wheel rotation control should be inhibited, depending upon the currently established operating state and the currently desired operating state of the differential.

The above object may be achieved according to one aspect of the present invention, which provides a control system for a motor vehicle having a plurality of wheels, comprising: (a) at least one differential for connecting a plurality of controllable wheels of the plurality of wheels of the vehicle, so as to permit differential actions of the controllable wheels; (b) a differential control device for controlling said at least one differential, said differential control device including operator-controlled input means for generating an output indicative of a desire of an operator of the vehicle, vehicle condition detecting means for generating an output indicative of a condition of the vehicle, a differential actuator for operating the above-indicated at least one differential to control the differential actions of the controllable wheels, and a differential controller for controlling the actuator on the basis of the outputs of the operator-controlled input means and the vehicle condition detecting means; (c) a wheel rotation control device for controlling rotation of the controllable wheels; (d) differential state detecting means for generating an output indicative of an operating state of each of the at least one differential; and (e) wheel rotation control determining means for determining, on the basis of the outputs of the differential state detecting means, the input means and the vehicle condition detecting means, whether a normal operation of the wheel rotation control device in a predetermined normal manner should be permitted or inhibited.

The output of the operator-controlled input means represents the operator's desire or intention, while the output of the differential state detecting means represents the actually established operating state of the differential. The output of the vehicle condition detecting means cooperates with the output of the input means to indicate the desired operating state of the differential that should be established in the current operating condition of the vehicle. The desired operating state of the differential may be established with high response to the outputs of the input means and the vehicle condition detecting means, or with some time delay with respect to those outputs. In the latter case, the differential may be held in a transient state, that is, in the process of shifting from one state to the desired operating state.

In view of the above recognition, the vehicle control system of the present invention constructed as described above is adapted to effect the determination as to whether the normal operation of the wheel rotation control device should be permitted or inhibited, depending upon not only the output of the operator-controlled input means but also the outputs of the differential state detecting means and the vehicle condition detecting means, in other words, on the basis of both the actually established operating state of the differential and the currently desired operating state of the differential.

Therefore, the present vehicle control system permits suitable and accurate determination as to whether the normal operation of the wheel rotation control device in the predetermined normal manner or mode should be permitted or inhibited.

The principle of the present invention will be further clarified.

[1] The operator-controlled input means includes, for example, an operable member operated by the vehicle operator to an operating position indicative of a desire of the operator, and means for converting a motion of the operable member into an electrical signal. Alternatively, the operator-controlled input means may include a voice-responsive or speed-recognition device for converting a voice or speed of the operator into an electrical signal.

[2] The "condition of the vehicle" is interpreted to include, for example, the running condition or state of the vehicle, such as the running speed and acceleration of the vehicle, and the smoothness or undulation, gradient and dry or wet state of the road surface on which the vehicle is running.

[3] The "differential" is interpreted to mean one of the following types or forms:

1. On a 4-wheel drive motor vehicle wherein right and left front wheels are connected to a front differential while right and left rear wheels are connected to a rear differential, and the front and rear differentials are connected to an engine through a transfer
   1-1. The above-indicated front differential which has a plurality of operating states for controlling the differential actions of the right and left front wheels
   1-2. The above-indicated rear differential which has a plurality of operating states for controlling the differential actions of the right and left rear wheels
   1-3. The above-indicated transfer of "part-time 4WD type" having a 2-wheel drive state (2WD state) in which the drive torque of the engine is transmitted to only the right and left front wheels or the right and left rear wheels, and a 4-wheel drive state (4WD state) in which the engine drive torque is transmitted to both of the front and rear wheels while substantially completely inhibiting the differential actions between the front and rear wheels.
2. On a r-wheel drive motor vehicle wherein the right and left front wheels connected to the front differential and the right and left rear wheels connected to the rear differential are connected to the engine through a center differential
   2-1. The above-indicated front differential having a plurality of operating states for controlling the differential actions of the right and left front wheels
   2-2. The above-indicated rear differential having a plurality of operating states for controlling the differential actions of the right and left rear wheels
   2-3. The above-indicated center differential which is adapted to transmit the engine drive torque to both of the front and rear wheels, and which is provided with a differential limiting device (e.g., mechanical lock, viscous coupling, wet-type multiple-disc clutch or torque-sensitive type) for limiting the differential slip amount
3. On a 2-wheel drive motor vehicle wherein only the right and left front wheels connected to the front differential or the right and left rear wheels connected to the rear differential are connected to the engine
   3-1. The above-indicated front or rear differential for the drive wheels, which has a plurality of operating states for controlling the differential actions of the right and left drive wheels

[4] The "at least one differential" whose actuator is controlled by the "differential control device" may consist of:

1. On the 4-wheel drive motor vehicle
   1-1. All of the front differential, rear differential and transfer (center differential)
   1-2. One of the front differential, rear differential and transfer (center differential)
   1-3. Both of the front and rear differentials Where at least one of the front and rear differentials is selected as the "at least one differential", the operating state or states of the non-selected differential or differentials or transfer may be used as the "condition of the vehicle".
2. On the 2-wheel drive motor vehicle
   2-1. The front or rear differential for the right and left drive wheels

[5] The "actuator" may be a device operated by a magnetic force or fluid pressure to effect the engaging and releasing action or rotating resistance of rotary members which are rotated with the wheels associated with the differential.

[6] The "actuator" may be adapted to selectively place the differential in one of a lock state in which the differential actions of the wheels associated with the differential are substantially completely inhibited, and a free state in which the differential actions are permitted. Alternatively, the "actuator" may be adapted to selectively place the differential in one of three or more operating states corresponding to slip limiting amounts of the differential, or adapted to continuously change the slip limit amount of the differential.

[7] The "wheel rotation control device" may be an anti-lock brake pressure control device, a traction control device or a yaw moment control device. The anti-lock brake pressure control device is adapted to control the braking torque of the wheel so as to prevent locking of the wheel during brake application to the vehicle. The traction control device is adapted to control the driving torque of each drive wheel of the vehicle so as to prevent spinning or slipping of the drive wheels. The yaw moment control device is adapted to brake right and left wheels of the vehicle such that the braking forces acting on the right and left wheels are made different from each other to thereby control the yaw moment of the vehicle for stabilizing the attitude of the running vehicle.

[8] Where the "wheel rotation control device" is adapted to control the braking pressures of the wheels, the braking pressures of the right and left wheels may be controlled independently of each other, or in the same manner. In the latter case, the wheel rotation control device may be a so-called "select low control" type wherein the braking pressure of one of the right and left wheels which lies on a road surface area having a comparatively high friction coefficient is controlled in the same manner as the braking pressure of the other wheel which lies on another road surface area having a comparatively low friction coefficient.

[9] Where the "wheel rotation control device" is adapted to control the braking pressure of the right and left wheels in the same manner, it appears that the complete inhibition of the differential actions between the right and left wheels does not cause a problem. However, even when the right and left wheels are braked with the same braking pressure, the longitudinal forces acting between the right and left wheels and the respective road surface areas in the running direction of the vehicle may be different from each other due to a difference between the friction coefficient values of the road surface areas, whereby the rotating conditions of the right and left wheels may differ from each other. Therefore, even where the wheel rotation control device is adapted to control the braking pressures of the right and left wheels in the same manner, it is desirable not to completely inhibit the differential actions of the right and left wheels running on the road surface areas having different friction coefficient values, in order to reduce the slip ratio of the wheel running on the road surface area having the comparatively low friction coefficient.

According to a first preferred form of the present invention, the above-indicated at least one differential includes a differential having a lock state in which differential actions of the controllable wheels are substantially completely inhibited, and a free state in which the differential actions are substantially completely permitted, and the operator-controlled input means generates a first and a second output signal indicative of desires of the operator to select the lock and free states of the differential, respectively. In this form of the vehicle control system, the differential controller of the differential control device controls the actuator to selectively place the differential in one of the lock and free states, depending upon the first and second output signals of the input means. The differential controller is further adapted to inhibit an operation of the differential actuator to place the differential in the lock state even in the presence of the first output signal of the input means, if the condition of the vehicle as indicated by the output of the vehicle condition detecting means satisfies a predetermined condition. Further, the wheel rotation control determining means is adapted to determine, on the basis of the outputs of the differential state detecting means, the input means and the vehicle condition detecting means, that the normal operation of the wheel rotation control device should be permitted, if the differential is placed in the free state even in the presence of the first output signal of the input means indicative of the desire of the operator to select the lock state.

In the above first preferred form of the vehicle control system, the determination as to whether the normal operation of the wheel rotation control device should be permitted or inhibited may be accomplished on the basis of the actually established operating state of the differential, and the wheel rotation control determining means determines that the normal operation of the wheel rotation control device should be permitted, if the differential remains in the free state after the vehicle operator has operated the input means to place the differential in the lock state.

In the present form of the invention, it is possible to correctly determine that the normal operation of the wheel rotation control device should be permitted, if the differential is found to be in the free state, even in the presence of the first output signal of the input means which represents the operator's desire to select or establish the lock state.

According to a second preferred form of this invention, the above-indicated at least one differential includes a differential having a lock state in which differential actions of the controllable wheels are substantially completely inhibited, and a free state in which the differential actions are substantially completely permitted, and the differential controller of the differential control device controls the actuator to selectively place the differential in one of the lock and free states. Further, the the wheel rotation control determining means is adapted to determine, on the basis of the outputs of the differential state detecting means, the input means and the vehicle condition detecting means, that the normal operation of the wheel rotation control device should be inhibited, if there exists a possibility that the differential is placed in a transient state in which the differential is in a process of shifting from the currently established free state to the lock state.

In this second preferred form of the vehicle control system, too, the determination as to whether the normal operation of the wheel rotation control device should be permitted or inhibited can be effected depending upon the actually established operating state (i.e., the free state) of the differential and the operating state (i.e., the lock state) which is to be established. Namely, the wheel rotation control determining means determines that the normal operation of the wheel rotation control device should be inhibited, if there is a possibility that the differential is in the process of shifting from the currently established free state to the lock state.

In the present vehicle control system according to the second preferred form of the invention, it is possible to correctly determine that the normal operation of the wheel rotation control device should be inhibited, if the differential is in the transient state, namely, in the process of shifting from the currently established free state to the lock state.

The above arrangement makes it possible to provide the vehicle operator with information indicating the inhibition of the normal operation of the wheel rotation control device, in quick response to the output of the operator-controlled input means, as soon as the wheel rotation control determining means has determined the inhibition of the normal operation of the wheel rotation control device. Thus, the present arrangement enables the vehicle operator to correctly understand the operating state of the vehicle control system without a delay.

According to a third preferred form of the present invention, the vehicle control system further comprises a monitor which is connected through a signal line to the differential state detecting means, for receiving an output signal of the differential state detecting means through the signal line, and the rotation control determining means is adapted to determine, on the basis of an output of the monitor and the outputs of the input means and the vehicle condition detecting means, that the normal operation of the wheel rotation control device should be inhibited, if there is a possibility of electrical disconnection of the signal line.

For example, the differential state detecting means may be connected to the rotation control determining means through a monitor, which is provided to monitor the output signal of the differential control detecting means. Described more specifically, the rotation control determining means is connected to the differential state detecting means through a series connection of the monitor and the signal line connecting the monitor to the differential state detecting means.

If the signal line between the monitor and the differential state detecting means is not disconnected, the output signal of the differential state detecting means as received by the monitor correctly represents the operating state of the differential. If the signal line was disconnected for some reason or other, the actual operating state of the differential would not be correctly represented by the output signal of the differential state detecting means as received by the monitor, namely, by the output of the monitor. Accordingly, the determination by the rotation control determining means of the actual operating state of the difference based solely on the output of the monitor may be erroneous. For instance, the rotation control determining means may determine that the differential is placed in the free state when it is in fact placed in the lock state. In this event, the rotation control determining means erroneously determines that the normal operation of the rotation control device should be permitted, while it should not be permitted. In the light of the above fact, the rotation control determining means according to the above third preferred form of the invention determines the inhibition of the normal operation of the wheel rotation control device to inhibit the normal operation, if the signal line between the monitor and the differential state detecting means is found to be disconnected.

The output of the monitor is affected by the output signal of the differential state detecting means and the presence or absence of the electrical disconnection of the signal line. That is, the output of the monitor in the presence of the electrical disconnection of the monitor differs from that in the absence of the electrical disconnection. The operating state of the differential to be established may be estimated on the basis of the outputs of the vehicle condition detecting means and the operator-controlled input means. Therefore, the output of the monitor in the absence of the electrical disconnection of the monitor may be estimated on the basis of the outputs of the vehicle condition detecting means and the input means. Consequently, it is possible to determine whether the signal line is disconnected or not, by comparing the operating state of the differential as represented by the output of the monitor with the operating state estimated on the outputs of the vehicle condition detecting means and the input means.

In the vehicle control system according to the third preferred form of the invention which is based on the above finding, the rotation control determining means determines that the normal operation of the wheel rotation control device should be inhibited, if the outputs of the monitor, vehicle condition detecting means and input means indicate a possibility that the signal line is electrically disconnected.

According to the above form of the invention, it is possible to determine whether there exists a possibility of the electrical disconnection of the signal line, and correctly determine the inhibition of the normal operation of the wheel rotation control device, if there exists the possibility.

According to a fourth preferred form of this invention, the vehicle control system further comprises normal operation inhibiting means for inhibiting at least one of the normal operation of the wheel rotation control device in the predetermined normal manner and a normal operation of the differential control device to control the differential in a predetermined normal manner, if the rotation control determining means determines that the normal operation of the wheel rotation control device should be inhibited.

It is desirable to reflect the result of the determination of the rotation control determining means, on at least one of the manners of operation of the differential control device and the wheel rotation control device. In the above form of the vehicle control system, the normal operation inhibiting means is provided to inhibit at least one of the normal operations of the differential control device and the wheel rotation control device, when the rotation control determining means has determined that the normal operation of the wheel rotation control device should be inhibited. Thus, the determination by the rotation control determining means that the normal operation of the wheel rotation control device should be inhibited makes it possible to avoid any inconvenience that may be caused by concurrent operations of the differential and wheel rotation control devices in the predetermined normal manners.

As described above, the vehicle control system according to the above fourth preferred form of this invention permits effective utilization of the result of the determination by the rotation control determining means, so as to avoid the undesirable normal operations of the differential control device and the wheel rotation control device.

However, the result of the determination by the rotation control determining means may be utilized for other purposes. For instance, the result may be used to provide a suitable indication that the normal operation of the wheel rotation control device is inhibited. In this case, the result of the determination may not be reflected on the manners of operations of the differential and wheel rotation control devices. The indication provided for the vehicle operator may be visual (by light), audible (by sound), or tactile (by vibration), for instance.

In one advantageous arrangement of the above fourth preferred form of the invention, the normal operation inhibiting means inhibits the normal operation of the wheel rotation control device if the rotation control determining means determines that the normal operation of the wheel rotation control device should be inhibited. In this case, the vehicle control system further comprises indicating means for informing the operator of the vehicle that the normal operation of the wheel rotation control device is inhibited.

One example of the indicating means may be a light which is turned on when the normal operation of the wheel rotation control device (e.g., anti-lock brake pressure control device) is inhibited.

The normal operation inhibiting means may be adapted to inhibit the normal operations of both the differential control device and the wheel rotation control device, or inhibit the normal operation of one of these two devices and permit the normal operation of the other device. In the latter case, the device whose normal operation may be inhibited to operate in any manner, or may alternatively be permitted to operate in a restricted manner in which the operating amount of the device is made smaller or larger than usual, so as to reduce the adverse effect which would occur if the device was operated in the predetermined normal manner.

According to a fifth preferred form of this invention, the rotation control device comprises an anti-lock brake pressure control device for controlling braking pressures to be applied to the controllable wheels, so as to prevent locking of said controllable wheels. Namely, the rotation control device in the form of the anti-lock brake pressure control device is adapted to control an anti-lock braking system (ABS system) of a motor vehicle.

According to a sixth preferred form of this invention, the plurality of wheels consists of a right front wheel and a left front wheel connected to each other by a front differential, and a right rear wheel and a left rear wheel connected to each other by a rear differential. In this case, the motor vehicle has a transfer connected to an engine and the front and rear differentials for distributing a drive torque of the engine to the front and rear differentials, and the above-indicated at least one differential controlled by the differential control device consists of at least one controllable differential consisting of at least one of the front and rear differentials. The transfer has (a) at least one of a high-speed four-wheel drive state in which the drive torque of the engine is transmitted to the front and rear differentials at a gear ratio for running the vehicle at a relatively high speed while differential actions between the front and rear wheels are substantially completely inhibited, and a high-speed two-wheel drive state in which the drive torque of the engine is transmitted to only the front or rear differential at a gear ratio for running the vehicle at a relatively high speed while the differential actions are substantially completely permitted, and (b) a low-speed four-wheel drive state in which the drive torque of the engine is transmitted to the front and rear differentials at a gear ratio for running the vehicle at a relatively low speed while the differential actions are substantially completely inhibited.

In one advantageous arrangement of the above sixth preferred form of this invention, the operator-controlled input means of the differential control device includes a differential lock selector switch operable by the operator between an OFF state for placing at least one of the above-indicated at least one controllable differential in a free state in which differential actions between the corresponding right and left wheels are substantially completely permitted, and an ON state for placing the controllable differential in a lock state in which the differential actions are substantially completely inhibited, and the vehicle condition detecting means of the differential control device includes a vehicle speed sensor for detecting a running speed of the vehicle, and a low-speed four-wheel drive state detector switch having an ON state when the transfer is placed in the low-speed four-wheel drive state, and an OFF state in which the transfer is not placed in the low-speed four-wheel drive state. Further, the differential state detecting means includes a differential lock detector switch having an ON state when the controllable differential is placed in the lock state, and an OFF state when the controllable differential is placed in the free state.

In the above arrangement, the differential controller of the differential control device may be adapted to inhibit an operation of the differential actuator to place the controllable differential in the lock state, for holding the controllable differential in the free state, even when the differential lock selector switch is placed in the ON state, if the low-speed four-wheel drive state detector switch is placed in the ON state.

Further, the differential controller may be adapted to inhibit the operation of the differential actuator to place the controllable differential in the lock state, for holding the controllable differential in the free state, even when the differential lock selector switch is placed in the ON state, if the differential lock selector switch has been placed in the OFF state, and the low-speed four-wheel drive state detector switch is placed in the ON state while the vehicle running speed detected by the vehicle speed sensor is higher than a predetermined threshold.

In the above advantageous arrangement of the sixth preferred form of this invention, the vehicle control system may further comprise a monitor which is connected through a signal line to the differential lock detector switch, for receiving an output signal of the differential lock detector switch through the signal line, and wherein the rotation control determining means comprising judging means for determining, on the basis of the output signal of the differential lock detector switch, an output of the monitor and the outputs of the low-speed four-wheel drive state detector switch and the vehicle speed sensor, one of (a) a first case where the differential controller of the differential control device inhibits an operation of the differential actuator to place the controllable differential in the lock state, even when the differential lock selector switch is placed in the ON state, (b) a second case where there exists a possibility that the controllable differential is in a transient state in which the controllable differential is in a process of shifting from the free state to the lock state, and (c) a third case where there exists a possibility that the signal line is electrically disconnected.

Regarding the above arrangement, it is noted that when the controllable differential is placed in the free state, the differential lock detector switch is OFF, so that an electric current does not flow through the signal line between the monitor and the differential lock detector switch. The electric current does not flow the signal line also when the signal line is electrically disconnected. Therefore, the signal received by the monitor when the controllable differential is placed in the free state is the same as that received when the signal line is disconnected. This means that the output of the monitor does not necessarily make it possible to correctly detect that the controllable differential is actually placed in the transient state, or correctly detect the actual electrical disconnection of the signal line.

However, it is possible to determine that there exists a possibility that the differential is placed in the transient state or that the signal line is electrically disconnected. If some other suitable information is used, it is correctly distinguish the case where the differential is in the transient state, from the case where the signal line is electrically disconnected.

In the above arrangement having the monitor connected to the differential lock detector switch, the monitor may be adapted to monitor a voltage of the output signal of the differential lock detector switch. The voltage is lower than a predetermined threshold when the differential lock detector switch is placed in the ON state while the signal line is not electrically disconnected, and higher than the predetermined threshold when the differential lock detector switch is placed in the OFF state or when the signal line is electrically disconnected.

The judging means indicated above may be arranged to determine the above-indicated first case (where the differential controller inhibits the operation of the differential actuator to place the controllable differential in the lock state, even when the differential lock selector switch is placed in the ON state), when the differential lock selector switch is placed in the ON state and when the low-speed four-wheel drive state detector switch is placed in the OFF state.

The judging means may also be arranged to determine the above-indicated first case, when the following condition is satisfied: the differential lock selector switch has been placed in the OFF state and is currently placed in the ON state; the low-speed four-wheel drive detector switch is placed in the ON state; and the vehicle running speed detected by the vehicle speed sensor is higher than a predetermined threshold.

The judging means may be adapted to determine the first case, when the following condition is satisfied: the differential lock selector switch has been and is currently placed in the ON state; the low-speed four-wheel drive state detector switch has been placed in the OFF state and is currently placed in the ON state; and the vehicle running speed is higher than the predetermined threshold.

The judging means may also be adapted to determine the above-indicated second case (where there exists a possibility of the controllable differential being placed in the transient state), when the following condition is satisfied: the differential lock selector switch is placed in the ON state; the low-speed four-wheel drive state detector switch is placed in the ON state; the vehicle running speed is lower than the predetermined threshold; and the voltage monitored by the monitor is higher than the predetermined threshold.

The judging means may be further adapted to determine the above-indicated third case (where there exists a possibility of the electrical disconnection of the signal line), when the following condition is satisfied: the differential lock selector switch is placed in the ON state; the low-speed four-wheel drive state detector switch is placed in the ON state; the vehicle running speed is lower than the predetermined threshold; and the voltage monitored by the monitor is higher than the predetermined threshold.

The judging means may be adapted to determine the above-indicated second case, when the following condition is satisfied; the differential lock selector switch has been and is currently placed in the ON state; the low-speed four-wheel drive state detector switch has been and is currently placed in the ON state; the vehicle running speed has been lower than and is currently higher than the predetermined threshold; and the voltage monitored by the monitor is higher than the predetermined threshold.

The judging means may be adapted to determine the above-indicated third case, when the following condition is satisfied; the differential lock selector switch has been and is currently placed in the ON state; the low-speed four-wheel drive state detector switch has been and is currently placed in the ON state; the vehicle running speed has been lower than and is currently higher than the predetermined threshold; and the voltage monitored by the monitor is higher than the predetermined threshold.

According to a seventh preferred form of this invention, the vehicle control system further comprises indicating means for providing a visual, audible or tactile indication that the normal operation of the wheel rotation control device is inhibited, when the rotation control determining means determines that the normal operation of the wheel rotation control device should be inhibited.

According to an eighth preferred form of this invention, the vehicle control system further comprises normal operation inhibiting means for inhibiting the normal operation of the wheel rotation control device and permitting the normal operation of the differential control device, when the rotation control determining means determines that the normal operation of the rotation control device should be inhibited.

Where the vehicle is a four-wheel drive vehicle wherein the differential control device is adapted to control the front differential connecting the right and left front wheels, or the rear differential connecting the right and left rear wheels, the normal operation inhibiting means may be arranged to inhibit the normal operation of the wheel rotation control device for all of the four wheels in the same manner. Alternatively, the normal operation inhibiting means may be arranged to inhibit the normal operation of the wheel rotation control device for only the right and left wheels connected to the front or rear differential controlled by the differential control device, and permit the normal operation of the wheel rotation control device for the right and left wheels connected to the front or rear differential not controlled by the differential control device.

According to a ninth preferred form of the invention, the vehicle control system further comprises normal operation inhibiting means for inhibiting the normal operation of the differential control device and permitting the normal operation of the wheel rotation control device, when the rotation control determining means determines that the normal operation of the wheel rotation control device should be inhibited.

According to a tenth preferred form of this invention, the vehicle control system further comprises normal operation inhibiting means for inhibiting the normal operation of the differential control device in the predetermined normal manner, and permitting the normal operation of the wheel rotation control device, when the rotation control determining means determines that the normal operation of the wheel rotation control device should be inhibited. In this case, the normal operation inhibiting means commands the differential control device to operate in a modified manner such that the amount of limitation of differential slip of the differential is made smaller than in the normal operation.

According to an eleventh preferred form of this invention, the vehicle control system further comprises normal operation inhibiting means for inhibiting the normal operation of the wheel rotation control device and permitting the normal operation of the differential control device, when the rotation control determining means determines that the normal operation of the wheel rotation control device should be inhibited. In this case, the normal operation inhibiting means commands the wheel rotation control device to operate in a modified manner such that the amount of change in the drive torque of the wheels associated with the differential controlled by the wheel rotation control device is made smaller than in the normal operation.

According to a twelfth preferred form of this invention, the above-indicated at least one differential includes a differential having a lock state in which differential actions of the controllable wheels are substantially completely inhibited, and a free state in which the differential actions are substantially completely permitted, and the operator-controlled input means generates a first and a second output signal indicative of desires of the operator to select the lock and free states of the differential, respectively. The differential controller of the differential control device is adapted to control the actuator to selectively place the differential in one of the lock and free states, depending upon the first and second output signals of the input means. The differential controller inhibits an operation of the differential actuator to place the differential in the lock state even in the presence of the first output signal of the input means, if the condition of the vehicle as indicated by the output of the vehicle condition detecting means satisfies a predetermined condition. In this case, the control system further comprises: an electric power source; a light which is turned on by the electric power source; a light switch for selectively placing the light in an ON state and an OFF state in which the light is on and off, respectively; and a light driver operated on the basis of the outputs of the operator-controlled input means, the differential state detecting means and the vehicle condition detecting means, for driving the light through the light switch, such that the light is alternately turned on and off if a desired operating state of the differential as indicated by the output of the input means does not coincide with an actual operating state in which the differential is actually placed. The light driver is adapted to control a drive signal to be applied to the light such that a pattern of the drive signal to alternately turn on and off the light in a first case where the desired and actual operating states do not coincide with each other due to inhibition of the operation of the differential actuator by the differential controller is different from a pattern of the drive signal to alternately turn on and off the light in a second case where the desired and actual operating states do not coincide with each other because the differential is in a process of shifting from the free state to the lock state.

The electric power source may be a DC power source or battery, and the light may be adapted to be held on and off when the differential is placed in the lock and free states, respectively, and alternately turned on and off when the differential is placed in the free state while the output of the input means indicates the lock state. The light switch may be a switch which is selectively turned on and off in response to an input signal.

In one advantageous arrangement of the above twelfth preferred form of the invention, the drive signal has different on-off time patterns in the first and second cases, for changing time durations for which the light is alternately on and off, respectively, between the first and second cases.

Alternatively, the drive signal have different voltages in the first and second cases.

According to another advantageous arrangement of the above twelfth preferred form of this invention, the rotation control determining means comprises the light driver, and rotation control judging means for determining, on the basis of the drive signal applied from the light driver to the light, whether the normal operation of the rotation control device should be permitted or inhibited.

In the above arrangement, the vehicle control system may further comprise a primary signal line connecting the electric power source to a ground, a first secondary signal line connected to the primary signal line, a monitor signal line connected to the first secondary signal line, and a monitor connected to the monitor signal line. In this arrangement, the light and the differential state detecting means are connected to the primary signal line, in the order of description in a direction from the electric power source toward the ground, and the first secondary signal line is connected at one end thereof to a portion of the primary signal line between points of connection thereof to the light and the differential state detecting means, and at the other end to the ground. The light switch is connected to the first secondary signal line, and has an input terminal connected to an output terminal of the light driver. The monitor signal line is connected at one end thereof to a portion of the first secondary signal line between points of connection thereof to the primary signal line and the light switch, and at the other end thereof to an input terminal of the monitor. The monitor has an output terminal connected to an input terminal of the light driver.

The vehicle control system indicated above may further comprise a second secondary signal line which is connected at one end thereof to a portion of the primary signal line between points of connection thereof to the first secondary signal line and the differential state detecting means. In this case, the second secondary signal line is connected at the other end thereof to the rotation control determining means so that the rotation control determining means determines, on the basis of a signal received from the second secondary signal line, whether the normal operation of said rotation control device should be permitted or inhibited.

According to a thirteenth preferred form of this invention, the vehicle control system further comprises: an electric power source; a light which is turned on by the electric power source; a differential lock detector switch which functions as the differential state detecting means and which is connected in series with the electric power source such that the light is disposed between the electric power source and the differential lock detector switch, the differential lock detector switch being on when the differential is placed in a lock state in which differential actions of the controllable wheels are substantially completely inhibited, and off when the differential is placed in a free state in which the differential actions are substantially completely permitted; a primary signal line connecting the light and the differential lock detector switch; a secondary signal line connected to the primary signal line; a monitor connected to the secondary signal line, for monitoring a voltage of a series circuit consisting of the differential lock detector switch, the primary signal line and a portion of the primary signal line which connects the differential lock detector switch and the secondary signal line; a light switch connected to a portion of the secondary signal line downstream of the monitor, for for selectively placing the light in an ON state and an OFF state in which the light is on and off, respectively; and a light driver operated on the basis of the outputs of the operator-controlled input means and the vehicle condition detecting means and an output of the monitor, for driving the light through the light switch, such that the light is alternately turned on and off if a desired operating state of the differential as indicated by the output of the input means does not coincide with an actual operating state of the differential as represented by the voltage monitored by the monitor. The light driver is adapted to control a drive signal to be applied to the light such that a pattern of the drive signal to alternately turn on and off the light in a first case where the desired and actual operating states do not coincide with each other due to inhibition of the operation of the differential actuator by the differential controller is different from a pattern of the drive signal to alternately turn on and off the light in a second case where the desired and actual operating states do not coincide with each other because the differential is in a process of shifting from the free state to the lock state or because at least one of the primary and secondary signal lines is electrically disconnected.

In one advantageous arrangement of the above thirteenth preferred form of the invention, the drive signal has different on-off time patterns in the first and second cases, for changing time durations for which the light is alternately on and off, respectively, between the first and second cases. Alternatively, the drive signal have different voltages in the first and second cases.

According to another aspect of the present invention, there is provided a control system for a motor vehicle having a plurality of wheels, comprising: (a) at least one differential for connecting a plurality of controllable wheels of the plurality of wheels of the vehicle, so as to permit differential actions of the controllable wheels; (b) a differential control device for controlling the above-indicated at least one differential, the differential control device including operator-controlled input means for generating an output indicative of a desire of an operator of the vehicle, vehicle condition detecting means for generating an output indicative of a condition of the vehicle, a differential actuator for operating the above-indicated at least one differential to control the differential actions of the controllable wheels, and a differential controller for controlling the actuator on the basis of the outputs of the operator-controlled input means and the vehicle condition detecting means; (c) a wheel rotation control device for controlling rotation of the controllable wheels; (d) differential state detecting means for generating an output indicative of an operating state of each of the above-indicated at least one differential; and (e) normal operation inhibiting means for inhibiting, on the basis of the outputs of the differential state detecting means, the input means and the vehicle condition detecting means, for inhibiting at least one of a normal operation of the wheel rotation control device in a predetermined normal manner and a normal operation of the differential control device to control the differential in a predetermined normal manner, if the normal operation of the wheel rotation control device should be inhibited.

In one preferred form of the vehicle control system according to the above aspect of this invention, the above-indicated at least one differential includes a differential having a lock state in which differential actions of the controllable wheels are substantially completely inhibited, and a free state in which the differential actions are substantially completely permitted, and the operator-controlled input means generates a first and a second output signal indicative of desires of the operator to select the lock and free states of the differential, respectively. The differential controller of the differential control device controls the actuator to selectively place the differential in one of the lock and free states, depending upon the first and second output signals of the input means. The differential controller is adapted to inhibit an operation of the differential actuator to place the differential in the lock state even in the presence of the first output signal of the input means, if the condition of the vehicle as indicated by the output of the vehicle condition detecting means satisfies a predetermined condition. Further, the normal operation inhibiting means is operated on the basis of the outputs of the differential state detecting means, the input means and the vehicle condition detecting means, to permit the normal operation of the wheel rotation control device, if the differential is placed in the free state even in the presence of the first output signal of the input means indicative of the desire of the operator to select the lock state.

In another preferred form of the above aspect of the invention, the above-indicated at least one differential includes a differential having a lock state in which differential actions of the controllable wheels are substantially completely inhibited, and a free state in which the differential actions are substantially completely permitted. In this case, the differential controller of the differential control device controls the actuator to selectively place the differential in one of the lock and free states. Further, the normal operation inhibiting means is operated on the basis of the outputs of the differential state detecting means, the input means and the vehicle condition detecting means, to inhibit the normal operation of the wheel rotation control device, if there exists a possibility that the differential is placed in a transient state in which the differential is in a process of shifting from the currently established free state to the lock state.

In a further preferred form of the same aspect of this invention, the control system further comprises a monitor which is connected through a signal line to the differential state detecting means, for receiving an output signal of the differential state detecting means through the signal line. In this case, the normal operation inhibiting means is operated on the basis of an output of the monitor and the outputs of the input means and the vehicle condition detecting means, to inhibit the normal operation of the wheel rotation control device, if there is a possibility of electrical disconnection of the signal line.

According to a further aspect of the present invention, there is provided a control system for a motor vehicle having a plurality of wheels, comprising: (a) at least one differential for connecting a plurality of controllable wheels of the plurality of wheels of the vehicle, so as to permit differential actions of the controllable wheels; (b) a differential control device for controlling the above-indicated at least one differential device, the differential control device including operator-controlled input means for generating an output indicative of a desire of an operator of the vehicle, vehicle condition detecting means for generating an output indicative of a condition of the vehicle, a differential actuator for operating the above-indicated at least one differential to control the differential actions of the controllable wheels, and a differential controller for controlling the actuator on the basis of the outputs of the operator-controlled input means and the vehicle condition detecting means; (c) a wheel rotation control device for controlling rotation of the controllable wheels; (d) differential state detecting means for generating an output indicative of an operating state of each of the above-indicated at least one differential; and (e) controller state determining means operated on the basis of the outputs of the differential state detecting means, the input means and the vehicle condition detecting means, for determining a state of the differential controller.

In one preferred form of the above aspect of the invention, the above-indicated at least one differential includes a differential having a lock state in which differential actions of the controllable wheels are substantially completely inhibited, and a free state in which the differential actions are substantially completely permitted. In this case, the operator-controlled input means generates a first and a second output signal indicative of desires of the operator to select the lock and free states of the differential, respectively, and the differential controller of the differential control device controls the actuator to selectively place the differential in one of the lock and free states, depending upon the first and second output signals of the input means. The differential controller is adapted to inhibit an operation of the differential actuator to place the differential in the lock state even in the presence of the first output signal of the input means, if the condition of the vehicle as indicated by the output of the vehicle condition detecting means satisfies a predetermined condition. Further, the controller state determining means determines whether the differential controller is inhibiting the differential actuator from operating to place the differential in the lock state.

In another preferred form of the above aspect of this invention, the controller state determining means determines whether there exists a possibility that the differential is in a process of shifting, under the control of the differential controller, from a free state in which differential actions the controllable wheels are substantially completely permitted, to a lock state in which the differential actions are substantially completely inhibited.

IN a further preferred form of the same aspect of the invention, the vehicle control system further comprises a monitor which is connected to through a signal line to the differential state detecting means, for receiving an output signal of the differential state detecting means through the signal line. In this case, the controller state determining means is operated on the basis of an output of the monitor and the outputs of the input means and the vehicle condition detecting means, for determining whether there exists a possibility of electrical disconnection of the signal line.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which:

FIG. 5 is a view indicating five different control states of the differential control device, and a relationship between the currently selected operating state of the rear differential and NORMAL and INHIBIT modes of the anti-lock brake pressure control device;

FIG. 6 is a flow chart illustrating a routine executed by the differential control device for driving an actuator for operating the rear differential;

FIG. 7 is a view in a tabular form indicating operating states of a transistor and a DIFFERENTIAL LOCK light of the differential control device, which states are selectively established according to a rule developed by the present inventor before the present invention was made;

FIG. 8 is a view in a tabular form for explaining a problem which occurs where the rule of FIG. 7 is used;

FIG. 9 is a flow chart illustrating a routine for driving the DIFFERENTIAL LOCK light of the differential control device;

FIG. 10 is a view corresponding to that of FIG. 7, indicating a rule used in place of the rule of FIG. 7 to solve the problem of FIG. 8;

FIG. 11 is a view corresponding to that of FIG. 5, indicating the operating states of the DIFFERENTIAL LOCK light selected according to the rule of FIG. 10;

FIG. 15 is a view in tabular form for explaining that the problem of FIG. 8 according to the rule of FIG. 7 is solved by the rule of FIG. 10; and FIGS. 16 and 17 are views in tabular form for explaining relationships of the NORMAL and INHIBIT modes of the anti-lock brake pressure control device, presence and absence of disconnection of signal lines associated with the DIFFERENTIAL LOCK light, and location of disconnection of the signal lines.

DETAILED DESCRIPTION OF THE PREFERRED EMBODIMENT

Figure 1:
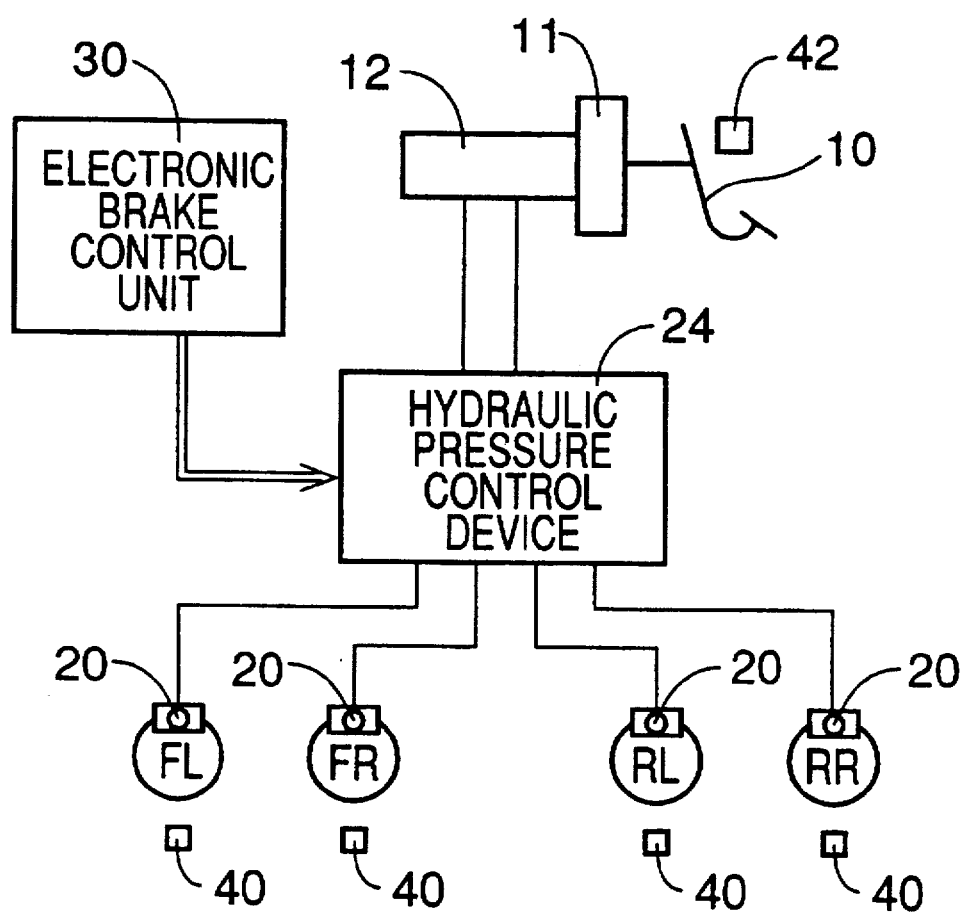
FIG. 1 is a schematic view showing one embodiment of a vehicle control system of the present invention which includes an anti-lock braking system comprising an anti-lock brake pressure control device.

Referring first to FIG. 1, there is schematically shown an anti-lock braking system for a motor vehicle, which includes an anti-lock brake pressure control device which functions as a wheel rotation control device of a vehicle control system according to one embodiment of this invention. The braking system includes a brake operating member in the form of a brake pedal 10 which is operatively linked to a master cylinder 12 through a booster 11. The master cylinder 12 is a tandem type having two mutually independent pressurizing chambers which are arranged in series. Pressures of a brake fluid are mechanically generated in the pressurizing chambers, depending upon an operating force acting on the brake pedal 10.

The anti-lock braking system is provided for a four-wheel motor vehicle, and has a hydraulically operated disk brake for each of four wheels. Each disk brake has a rotary member in the form of a disk rotor FL, FR, RL, RR rotating with the corresponding wheel, a pair of friction members in the form of a pair of brake pads disposed in opposed relation with the opposite surfaces of the disk rotor, and a wheel brake cylinder 20 for operating an piston to force the brake pads onto the opposite surfaces of the disk rotor, to thereby apply a resistance to rotary motions of the disk rotor and the corresponding wheel. The wheel brake cylinder 20 is connected to the master cylinder 12 through a hydraulic pressure control device 24.

The hydraulic pressure control device 24 has a plurality of operating states which are selectively established. The operating states include: a pressure increasing state in which the wheel brake cylinder 20 is communicated with the master cylinder 12; a pressure reducing state in which the wheel brake cylinder 20 is communicated with a reservoir (not shown) as well known in the art; and a pressure holding state in which the wheel brake cylinder 20 is disconnected from both the master cylinder 12 and the reservoir. The hydraulic pressure control device 24 includes a solenoid coil, and is selectively placed in one of the pressure increasing, reducing and holding states, depending upon a magnetic force produced by the solenoid coil.

The hydraulic pressure control device 24 may include one three-position valve or a combination of two two-position valves, for each of the four wheel brake cylinders 20. In the former case, each three-position valve has the pressure increasing, reducing and holding states. In the latter case, the first two-position valve has the pressure increasing and holding states, while the second two-position valve has the pressure reducing and holding states. Alternatively, the hydraulic pressure control device 24 may be adapted such that pistons are fluid-tightly and slidably movably received in respective pressure control chambers formed in a housing in communication with the respective wheel brake cylinders 20. In operation, the pistons are operated by suitable drive sources, so as to regulate hydraulic pressures in the respective pressure control chambers. The drive sources may be electric motors, piezoelectric elements, and other elements capable of converting an electric energy into a mechanical energy.

During normal brake application to the wheel, the hydraulic pressure control device 24 is placed in the pressure increasing state, so that the hydraulic pressure corresponding to the operating force of the brake pedal 10 is applied to the wheel brake cylinder 20. In an anti-lock brake pressure control operation, the hydraulic pressure control device 24 is selectively placed in the pressure reducing, holding states and increasing states under the control of an electronic brake control unit 30, to regulate the hydraulic pressure in each of the wheel brake cylinders 20 in an anti-lock fashion. The hydraulic pressure control device 24 is considered to be an actuator for operating the wheel brake cylinders 20.

Figure 2:
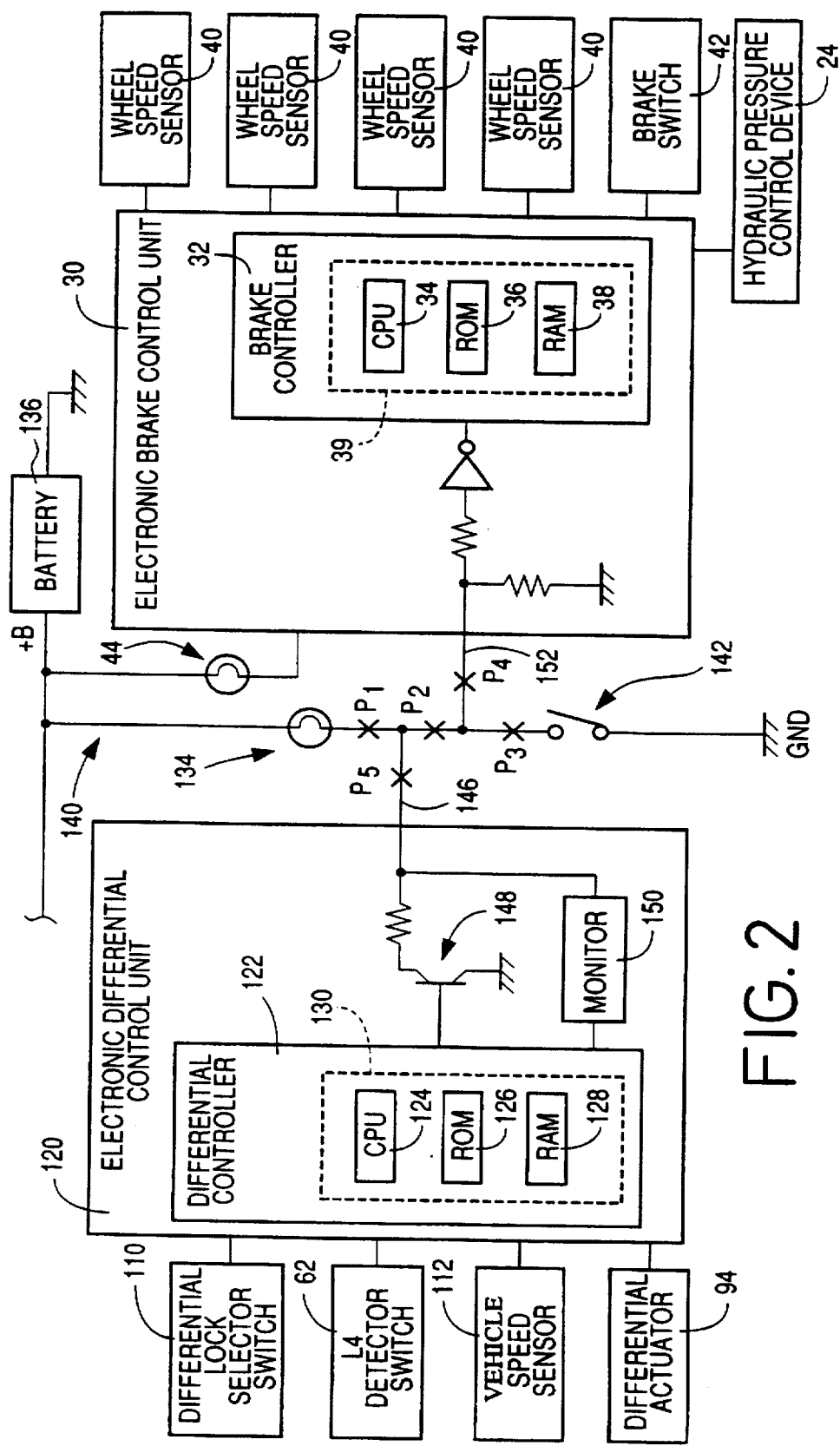
FIG. 2 is block diagram illustrating an electric arrangement of the anti-lock brake pressure control device, and an electric arrangement of a differential control device which is also included in the vehicle control system and which is electrically connected to the anti-lock brake pressure control device.

The electronic brake control unit 30 cooperates with the hydraulic pressure control device 24 to constitute a major portion of the anti-lock brake pressure control device. The brake control unit 30 includes a brake controller 32 as shown in FIG. 2. The brake controller 32 is principally composed of a computer 39 incorporating a central processing unit (CPU) 34, a read-only memory (ROM) 36, and a random-access memory (RAM) 38.

To an input interface of the electronic brake control unit 30, there are connected wheel speed sensors 40 for detecting rotating speeds Vw of the respective wheels, and a brake switch 42 for detecting an operation of the brake pedal 10. To an output interface of the brake control unit 30, there are connected the above-indicated hydraulic pressure control device 24, and an ANTI-LOCK-CONTROL INHIBIT light 44 which is turned ON to inform the vehicle operator that the anti-lock brake pressure control device (anti-lock braking system) is in an INHIBIT mode in which the anti-lock brake pressure control operation under the control of the brake control unit 30 is inhibited. When the light 44 is OFF, it indicates that the anti-lock brake pressure control device is in a NORMAL mode in which the anti-lock brake pressure control operation under the control of the brake control unit 30 is permitted.

The ROM 36 of the brake controller 32 stores various control programs for electrically controlling the hydraulic pressure control device 24 to regulate the hydraulic braking pressures to be applied to the individual wheel brake cylinders 20 in the anti-lock fashion. These control programs are executed by the CPU 34 while utilizing a temporary data storage function of the RAM 38.

The vehicle control system further includes a differential control device for selectively placing a rear differential 56 in a LOCK or FREE state, according to the intention or desire of the vehicle operator.

Figure 3:
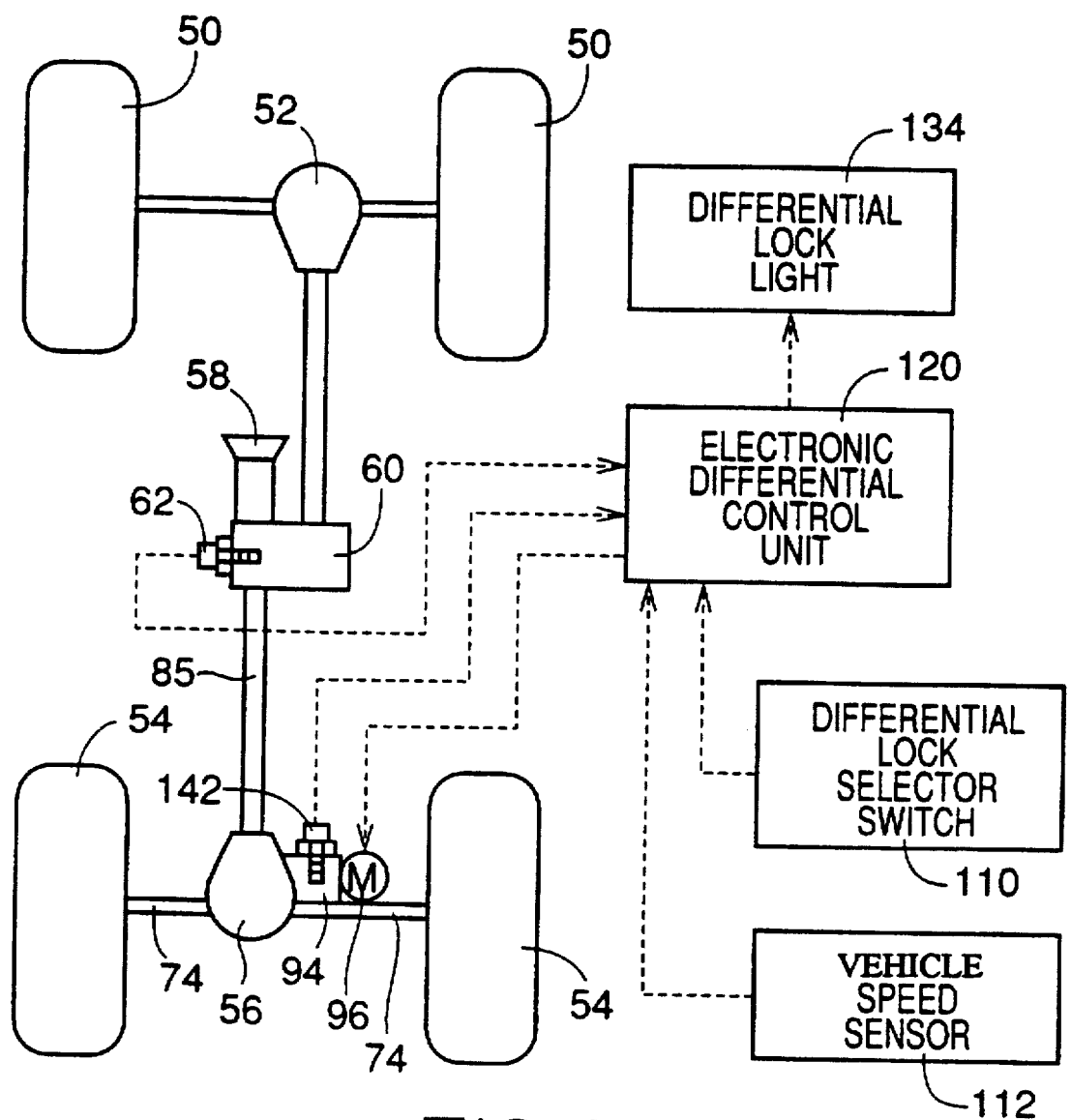
FIG. 3 is a schematic plan view of a motor vehicle as equipped with a rear differential controlled by the differential control device, with components of the differential control device being shown in a block diagram.

The motor vehicle equipped with the present vehicle control system is a four-wheel-drive vehicle provided with four drive wheels 50, 54 as shown in FIG. 3. The right and left front wheels 50 are connected to each other by a front differential 52, while the right and left rear wheels 54 are connected to each other by the rear differential 56 indicated above. The vehicle has a transmission 58 connected to an engine as well known in the art. The front differential 52 and the rear differential 56 are connected to the transmission 58 through a transfer 60.

The transfer 60 is adapted to distribute a drive torque of the engine to the front and rear differentials 52, 56. Described in detail, the transfer 60 has a high-speed two-wheel drive state (hereinafter referred to as "H2 drive state"), a high-speed four-wheel drive state (hereinafter referred to as "H4 drive state"), and a low-speed four-wheel drive state (hereinafter referred to as "L4 drive state". In the H2 drive state, the drive torque of the engine is transmitted to only the rear differential 56 at a gear ratio or speed reduction ratio for running the vehicle at a relatively high speed while the differential actions between the front and rear wheels 50, 54 are substantially completely permitted. In the H4 drive state, the drive torque of the engine is transmitted to the front and rear differentials 52, 56 at a gear ratio or speed reduction ration for running the vehicle at a relatively high speed, and the differential actions between the front and rear wheels 50, 54 are substantially completely inhibited, that is, the front and rear wheels 50, 54 are not permitted to have different rotating speeds. In the L4 drive state, the drive torque of the engine is transmitted to the front and rear differentials 52, 56 at a gear ratio or speed reduction ratio for running the vehicle at a relatively low speed, and the differential actions between the front and rear wheels 50, 54 are substantially completely inhibited. The transfer 60 is operated to one of these H2, H4 and L4 drive positions, by a shift lever which is mechanically connected to the transfer 60 and which is operated the vehicle operator.

When the transfer 60 is placed in the L4 drive position, a L4 detector switch 62 is in an ON or closed state. When the transfer 60 is placed in the H2 or H4 drive state, the L4 detector switch 62 is in an OFF Or open state. Thus, the L4 drive position is detected by the L4 detector switch 62.

Figure 4:
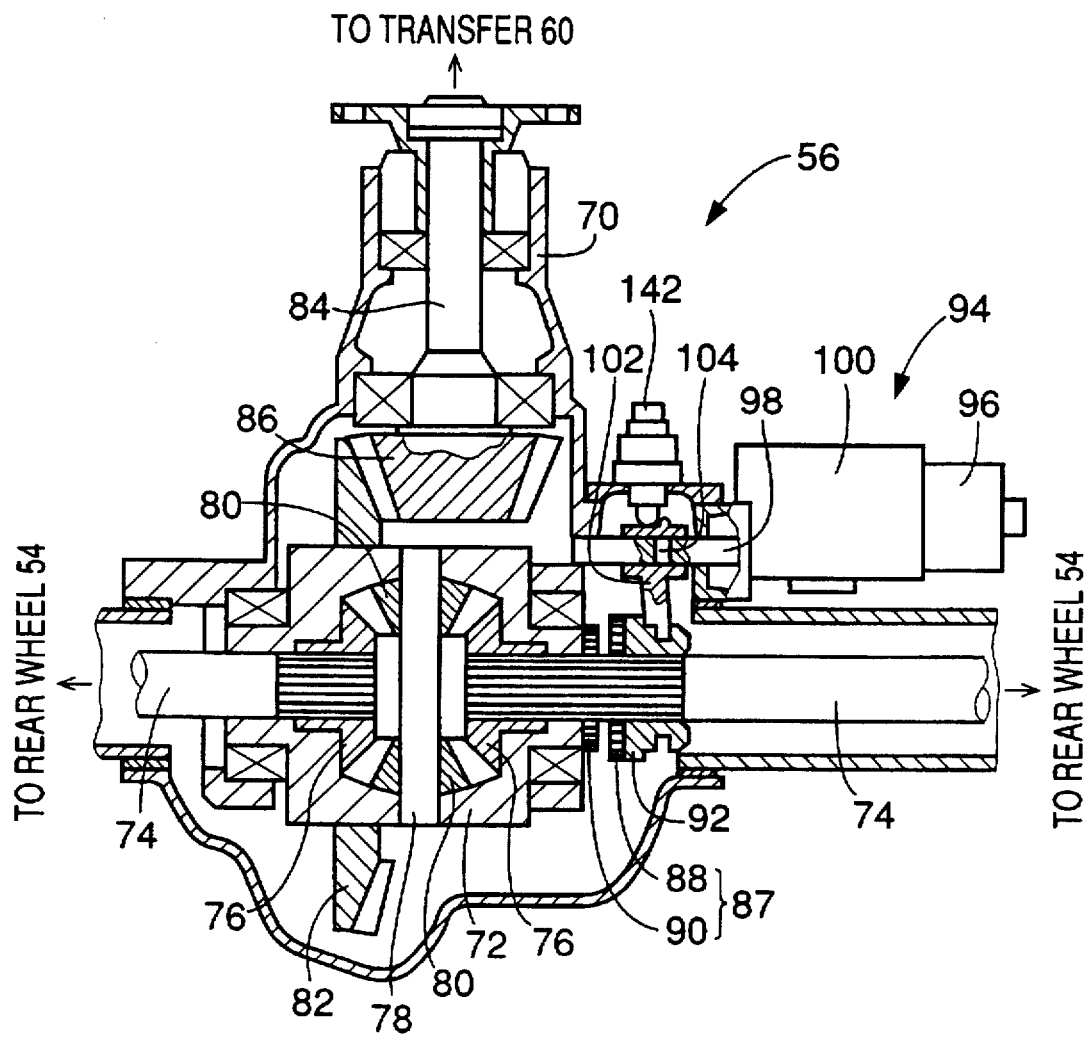
FIG. 4 is a front elevational view in cross section showing details of construction of the rear differential of the vehicle.

The rear differential 56 is constructed as shown in detail in FIG. 4. The rear differential 56 has a hollow housing 70 in which a differential casing 72 is accommodated rotatably about an axis parallel to the axes of the right and left rear wheels 54. In the differential casing 72, there are disposed a pair of differential side gears 76 which rotate with rear axles 74, which in turn rotate with the respective right and left wheels 54. The two side gears 76 are opposed to each other in the axial direction. The differential casing 72 has a pinion shaft 78 fixed thereto such that the pinion shaft 78 extends in a direction perpendicular to the rear axles 74. The pinion shaft 78 support a pair of differential pinions 80 rotatably about a centerline thereof, such that the two pinions 80 are opposed to each other in the axial direction. The differential pinions 80 mesh with the differential side gears 76, at two diametrically opposite positions of each side gear 76. A ring gear 82 is attached to the differential casing 72 such that the ring gear 82 is coaxial with the casing 72. The ring gear 82 is rotated by a driving pinion 86 fixed at the end of a rear drive shaft 84. The rear drive shaft 84 is connected to the transfer 60 through a propeller shaft 85 as shown in FIG. 3.

Between the differential casing 72 and one of the two rear axles 74, there is provided a dog clutch 87 which includes two mutually engageable members 88, 90. The first member 88 is provided on the above-indicated one rear axle 74, and the second member 90 is attached to the differential casing 72. The first member 88 is attached to an axially movable member 92 which is attached to the above-indicated rear axle 74 such that the axially movable member 92 is not rotatable relative to the rear axle 74, namely, rotated with this rear axle 74, and is axially movable relative to the rear axle 74. The dog clutch 87 as shown in FIG. 4 is placed in a released state in which the mutually engageable members 88, 90 are spaced apart from each other. In this released state of the dog clutch 87, the differential casing 72 and the above-indicated rear axle 74 can be rotated freely relative to each other. When the dog clutch 87 is placed in the released state, the rear differential 56 is placed in the FREE state in which the differential actions between the right and left rear wheels 54 are substantially completely permitted. When the mutually engageable members 88, 90 are brought into engagement with each other, the dog clutch 87 is placed in an engaged state in which relative rotation of the differential casing 72 and the above-indicated rear axle 74 is prevented. In this engaged state of the dot clutch 87, the rear differential 56 is placed in the LOCK state in which the differential actions between the right and left rear wheels 54 are substantially completely inhibited, that is, the right and left rear wheels 50 are not permitted to have different rotating speeds.

The dot clutch 87 is operated by a differential actuator 94. That is, the axially movable member 92 of the dog clutch 87 is axially moved by the differential actuator 94, between two positions corresponding to the FREE and LOCK positions of the rear differential 56 (the released and engaged states of the clutch 87). The differential actuator 94 includes a drive source in the form of an electric motor 96, a driving member in the form of a plunger 98, a motion converting mechanism 100 for converting a rotary motion of the motor 96 into a linear motion of the plunger 98, and a motion transfer member 102 for transferring the linear motion of the plunger 98 to the axially movable member 92. The motion transfer member 102 and the plunger 98 are fixed to each other by a pin 104 for inhibiting a relative movement in the axial direction.

In the present embodiment, the differential actuator 94 is provided for only the rear differential 56, so that only the differential actions between the right and left rear wheels 54 are controlled by the differential control device. In this respect, the rear wheels 54 are controllable wheels whose differential actions are controllable by the rear differential 56 and the differential actuator 94.

While the dog clutch 87 and the differential actuator 94 which have been described above constitute a mechanical part of the differential control device, there will be described an electrical control part of the differential control device.

The differential control device includes the L4 detector switch 62 mentioned above, a DIFFERENTIAL LOCK selector switch 110, a vehicle speed sensor 112, and an electronic differential control unit 120, as illustrated in FIG. 2. The differential control unit 120 receives the output signals of the selector switch 110, L4 detector switch 62 and vehicle speed sensor 112. The differential control unit 120 is basically arranged to control the differential actuator 94 for selectively placing the rear differential 56 in the LOCK or FREE state, according to the output signal of the DIFFERENTIAL LOCK selector switch 110, which indicates whether the the vehicle operator desires to establish the LOCK state of the rear differential 56 or not. However, the differential control unit 120 is adapted to ignore the operator's desire or intention as represented by the output signal of the selector switch 110, if the establishment of the LOCK state of the rear differential 56 under the particular running condition of the vehicle is not desirable for safe and stable running of the vehicle. In this case, the differential control unit 120 automatically inhibits the rear differential 56 from being brought to the LOCK state, even in the presence of the operator's desire to place the rear differential 56 in the LOCK state, namely, even if the output signal of the DIFFERENTIAL LOCK selector switch 110 indicates the selection of the LOCK state.

A determination by the differential control unit 120 as to whether the establishment of the LOCK state of the rear differential 56 should be inhibited or not is effected on the basis of the output signal of the DIFFERENTIAL LOCK selector switch 110, and the current running condition of the vehicle as represented by the outputs of the L4 detector switch 62 and the vehicle speed sensor 112. The vehicle operator turns ON the selector switch 110 when the operator desires to place the rear differential 56 in the LOCK state, and turns OFF the selector switch 110 when the operator desires to place the rear differential 56 in the FREE state. In the present embodiment, the selector switch 110 functions as operator-controlled input means. As described above, the output signal of the L4 detector switch 62 indicates whether the transfer 60 is placed in the L4 drive state or not. The output signal of the vehicle speed sensor 112 represents the running speed of the vehicle. In the present embodiment, the L4 detector switch 62 and the vehicle speed sensor 112 function as vehicle condition detecting means for detecting the running condition of the vehicle.

The inhibition of the establishment of the LOCK state of the rear differential 56 in relation to the operating states of the DIFFERENTIAL LOCK selector switch 110 and the transfer 60 (L4 detector switch 62) and the vehicle running speed will be described in detail by reference to tables in FIG. 5. It is noted that the lower table forms a part of the upper table which corresponds to the vehicle running state in which the selector switch 110 is ON while the transfer 60 is placed in the L4 drive state (while the L4 detector switch 62 is ON).

As indicated in FIG. 5, the differential control unit 120 has the following five control states with respect to the rear differential 56:

(1) First Control State

This first control state is selected when the DIFFERENTIAL LOCK selector switch 110 is OFF, that is, when the vehicle operator does not desire to select the LOCK state of the rear differential 56. This first control state is selected irrespective of whether the transfer 60 is placed in the L4 drive state or in the H2 or H4 drive state, as long as the selector switch 110 is OFF. In this first control state, the rear differential 56 is placed in the FREE state.

(2) Second Control State

This second control state is selected when the selector switch 110 is ON, that is, when the vehicle operator desires to select the LOCK state, and when the transfer 60 is placed in the H2 or H4 drive state, that is, when the L4 detector switch 62 is OFF. In this second control state, the rear differential 56 is held in the FREE state even if the selector switch 110 is ON. Thus, the establishment of the LOCK state of the rear differential 56 is automatically inhibited in this second control state. In this respect, it is noted that when the transfer 60 is placed in the H2 or H4 drive state, the vehicle is likely to be running at a comparatively high speed, and the turning stability of the vehicle at such high speed tends to be deteriorated if the rear differential 56 is brought to its LOCK state in such running condition. Therefore, the differential control unit 120 inhibits the activation of the differential actuator 94 to place the rear differential 56 in the LOCK state even when the output signal of the DIFFERENTIAL LOCK selector switch 110 indicates the vehicle operator's desire to establish the LOCK state.

(3) Third, Fourth and Fifth Control States

These third, fourth and fifth control states are selected when the selector switch 110 is ON, that is, when the vehicle operator desires to select the LOCK state, and when the transfer 60 is placed in the L4 drive state, that is, when the L4 detector switch 62 is ON. In these control states, the rear differential 56 is placed in the LOCK state in principle, but may be held in the FREE state even if the selector switch 110 is ON.

Described more specifically, the fifth control state is selected in the following condition:

5-1. The selector switch 110 is ON.

5-2. The L4 detector switch 62 is ON (when the transfer 60 is in the L4 drive state).

5-3. The vehicle speed is in a LOW range lower than a predetermined limit, for example, 8 km/h.

In the fifth control state, the differential control unit 120 activates the differential actuator 94 to bring the rear differential 56 to the LOCK state according to the vehicle operator's intention as represented by the output signal of the selector switch 110.

The third and fourth control states are selected when the selector switch 110 and the L4 detector switch 62 are both ON and when the vehicle speed is in a HIGH range not lower than the predetermined limit 8 km/h, for example. The third and fourth control states are selectively established depending upon whether the differential control unit 120 was placed in the fifth control state in the last control cycle, namely, whether the vehicle speed was relatively low in the last control cycle and has increased to a level within the HIGH range (e.g., 8 km/h or higher) in the present control cycle. The third control state is selected when the differential control unit 120 was not placed in the fifth control state in the last control cycle, that is, when the vehicle speed was in the HIGH range in the last control cycle. In the third control state, the rear differential 56 is held in the FREE state even in the presence of the operator's desire to select the LOCK state, whereby the establishment of the LOCK state is inhibited.

The fourth control state is selected when the fifth control state was established in the last control cycle, that is, when the vehicle speed has been raised to a level within the HIGH range for the first time while the selector switch 110 and the L4 detector switch 62 remain ON. In this fourth control state, the differential control unit 120 activates the differential actuator 94 to bring the rear differential 56 to the LOCK state according to the vehicle operator's desire, even when the vehicle speed is in the HIGH range.

The differential control unit 120 of the differential control device includes a differential controller 122 principally constituted by a computer 130 which incorporates a central processing unit (CPU) 124, a read-only memory (ROM) 126 and a random-access memory (RAM) 186. The ROM 126 stores various control programs including a program for executing a routine for driving the differential actuator 94, as illustrated in the flow chart of FIG. 6. The CPU 124 executes this differential actuator drive routine of FIG. 6 according to the control program in the ROM 126 while utilizing a temporary data storage function of the RAM 128.

The differential actuator drive routine of FIG. 6 is initiated with step S1 to receive and read the output signals of the DIFFERENTIAL LOCK selector switch 110, L4 detector switch 62 and vehicle speed sensor 112, and a signal indicative of one of the five control states in which the differential control device (differential controller 122) was placed in the last cycle of execution of the routine.

Step S1 is followed by step S2 to select one of the five control states according to the signals received in step S1. Then, the control flow goes to step S3 to control the differential actuator 94 according to the control state selected in step S2, as described above by reference to FIG. 5. This differential actuator drive routine is executed each time a predetermined condition is satisfied, for example, repeatedly executed at a predetermined time interval.

The differential control device is provided with a DIFFERENTIAL LOCK light 134, as shown in FIG. 2. The differential controller 122 holds this light 134 in an ON state while the rear differential 56 is held in the LOCK state, and holds the light 134 in an OFF state while the rear differential 56 is held in the FREE state.

The DIFFERENTIAL LOCK light 134 is connected to a primary signal line 140 which extends between a DC power source in the form of a battery 136 and the ground GND. A DIFFERENTIAL LOCK detector switch 142 is provided in a portion of the primary signal line 140 between the DIFFERENTIAL LOCK light 134 and the ground GND.

The DIFFERENTIAL LOCK detector switch 142 is adapted to mechanically detect the position of the plunger 98 when the rear differential 56 is placed in the LOCK position. The detector switch 142 has a sensing element which is movable between an upper and a lower position, in sliding contact with an upper surface of the motion transfer member 102 of the differential actuator 94. This upper surface of the member 102 has a projection for moving the sensing element of the detector switch 142 to the upper position when the member 102 is moved to the left (as seen in FIG. 4) by the plunger 98 when the differential actuator 94 is operated to place the rear differential 56 in the LOCK position. The detector switch 142 is closed or turned ON when the sensing element is moved to the upper position, that is, when the rear differential 56 is brought to the LOCK state. In the FREE state of FIG. 4 of the rear differential 56, the sensing element of the detector switch 142 is placed in the lower position, whereby the detector switch 142 is open or OFF. The detector switch 142 functions as means for detecting the operating state of the rear differential 56.

The DIFFERENTIAL LOCK detector switch 142 may be replaced by other types of detector or sensor, such as an optical sensor including a light emitting element and a light receiving element which are positioned so that the amount of light emitted by the emitting element and received by the receiving element changes in two steps depending upon whether the rear differential 56 is placed in the LOCK or FREE state. Further, the LOCK state of the rear differential 56 may be indirectly detected by detecting that a difference between the rotating speeds of the right and left rear wheels 54 is substantially zero.

When the DIFFERENTIAL LOCK detector switch 142 is ON with the rear differential 56 placed in the LOCK state, the DIFFERENTIAL LOCK light 134 is held ON with an electric current applied thereto from the battery 136, informing the vehicle operator that the rear differential 56 is placed in the LOCK state. In the FREE state of the rear differential 56, the detector switch 142 is OFF, and the electric current does not flow through the light 134 from the battery 136 to the ground GND, whereby the light 134 is held OFF, informing the operator that the rear differential 56 is placed in the FREE state.

As described above, the differential control device is adapted to control the rear differential 56 to be placed in the FREE or LOCK state, basically according to the command entered through the DIFFERENTIAL LOCK selector switch 110 by the vehicle operator, namely, according to the operator's desire or choice to select the LOCK or FREE state. Under some running condition of the vehicle, however, the operating state of the rear differential 56 as established under the control of the differential control unit 120 does not coincide with the operator's choice. That is, the rear differential 56 remains in the FREE state even in the presence of the operator's desire to select the LOCK state, when the differential control unit 120 is placed in the second or third control state, as described above. In view of this fact, the present embodiment is adapted to flicker the DIFFERENTIAL LOCK light 134 to inform the operator that the rear differential 56 remains in the FREE state even if the selector switch 110 has been turned ON by the operator.

That is, the DIFFERENTIAL LOCK light 134 is alternately turned ON and OFF, namely, held in a flickering state, while the differential control unit 120 is placed in the second or third control state in which the rear differential 56 remains in the FREE state contrary to the operator's intention to select the LOCK state.

The currently selected operating state of the rear differential 56 does not coincide with the operator's desire or intention also when the rear differential 56 is in a transient state, that is, in the process of engagement of the two mutually engageable members 88, 90 of the dog clutch 87.

When the selector switch 110 is turned ON by the operator while the vehicle is in a stop, the differential control unit 120 commands the differential actuator 94 to bring the rear differential 56 to the LOCK state. In this case, the mutually engageable members 88, 90 may not correctly engage each other, and the rear differential 56 remains in the FREE state, while the vehicle is in a stop. After the vehicle has started, the relative phase of the two members 88, 90 of the dog clutch 87 changes, eventually causing the dog clutch 87 to be fully engaged, whereby the rear differential 56 is correctly brought to the LOCK state. Thus, there is a case where the dog clutch 87 cannot be correctly engaged to establish the LOCK state of the rear differential 56 even when the differential actuator 94 is activated by the differential control unit 120 in response to the output signal of the DIFFERENTIAL LOCK selector switch 110. In this case where the rear differential 56 is in the transient state, however, it is evident that the rear differential 56 will be correctly placed in the LOCK state after the vehicle has started. The present embodiment is adapted to flicker the DIFFERENTIAL LOCK light 134 also when the rear differential 56 is not brought to the LOCK state even in the presence of the output signal of the selector switch 110 indicative of the operator's selection of the LOCK state.

The DIFFERENTIAL LOCK light 134 is controlled to flicker (alternately turned ON and OFF) by an arrangement described below.

As shown in FIG. 2, a first secondary signal line 146 is connected at one end to a portion of the primary signal line 146 between the DIFFERENTIAL LOCK light 134 and the DIFFERENTIAL LOCK detector switch 142. The first secondary signal line 146 is connected at the other end to a terminal of the differential control unit 120, which has a lamp switch in the form of a transistor 148. The first secondary signal line 146 is connected through this transistor 148 to an output of the differential controller 122 of the differential control unit 120.

Since the first secondary signal line 146 connected at one end thereof to the transistor 148 is connected at the other end to the portion of the primary signal line 140 between the light 134 and the detector switch 142, the light 134 can be turned ON with an electric current flowing from the battery 136 when the transistor 148 is ON, even if the detector switch 142 is OFF with the rear differential 56 held in the FREE state. This arrangement permits the light 134 to be turned ON by turning ON the transistor 148, even if the primary signal line 140 is disconnected at position P2 or P3, while the detector switch 142 is ON. As indicated in FIG. 2, the positions P2 and P3 are between the point of connection of the lines 140 and 146 and the detector switch 142.

The differential control unit 120 includes a monitor 150 which is used primarily for monitoring if the DIFFERENTIAL LOCK detector switch 142 is ON or OFF. To this end, the monitor 150 is connected to the first secondary signal line 146, to detect a voltage at the point of connection thereof to the signal line 146. When the detector switch 142 is ON, the electric current from the battery 136 does not flow into the differential control unit 120, and the voltage detected by the monitor 150 is substantially equal to the ground voltage GND, namely, is in a LOW range lower than a preset level. When the detector switch 142 is OFF, the current flows from the battery 136 into the differential control unit 120, and the voltage detected by the monitor 150 is substantially equal to the voltage +B of the battery 136, namely, is in a HIGH range higher than the preset level. Accordingly, the differential controller 120 can determine whether the detector switch 142 is ON or OFF, depending upon the voltage as detected by the monitor 150.

When the differential controller 122 is placed in the second or third control state, the rear differential 56 is placed in the FREE state with the dog clutch 87 being fully released, and the detector switch 142 is OFF, whereby the voltage detected by the monitor 150 is in the HIGH range, provided there are no defects (e.g., sticking together of the members 88, 90 of the dog clutch 87) in the elements associated with the detection of the operating state of the rear differential 56. The voltage detected by the monitor 150 will be referred to as "monitor voltage".

When the differential controller 122 is placed in the fourth or fifth control state, the dog clutch 87 is fully engaged at a normal speed, and the rear differential 56 is correctly brought to the LOCK state, whereby the detector switch 142 is turned ON, and the monitor voltage is in the LOW range. If the rear differential 56 is in the transient state (i.e., remains in the FREE state) with the dog clutch 87 being unable to be fully engaged at the normal speed, the detector switch 142 remains OFF, whereby the monitor voltage is in the HIGH range.

The monitor voltage is detected while the DIFFERENTIAL LOCK selector switch 110 is ON. If the monitor voltage is in the HIGH range, it means that the DIFFERENTIAL detector switch 142 is OFF while the rear differential 56 is in the FREE state. That is, the differential controller 122 is placed in one of the second and third control states if the rear differential 56 is not in the transient state, or alternatively in one of the fourth and fifth control states if the rear differential 56 is in the transient state.

However, the monitor voltage in the HIGH range does not necessarily indicate that the detector switch 142 is OFF. Even if the detector switch 142 is ON, the electric current would flow from the battery 136 into the differential control unit 120 if the primary signal line 140 was disconnected at the position P2 or P3. In this case, the monitor voltage would be in the HIGH range even with the detector switch 132 held ON.

In view of the above, the present embodiment is adapted to determine that the rear differential 56 is in the transient state or the primary signal line 140 is disconnected at P2 or P3 if the monitor voltage is in the HIGH range when the differential controller 122 is placed in the fourth or fifth control state in which the differential actuator 94 is commanded to operate to place the rear differential 56 in the LOCK state.

In the present embodiment, the DIFFERENTIAL LOCK light 134 is controlled to flicker if the monitor voltage is in the HIGH range while the DIFFERENTIAL LOCK selector switch 110 is ON. Thus, the DIFFERENTIAL LOCK light 134 is controlled to flicker in the second and third control states in which the establishment of the LOCK state is inhibited. The light 134 is also controlled to flicker when the rear differential 56 is in the transient state or the signal line 140 is disconnected at P2 or P3 while the fourth or fifth control state is established.

It is noted that the actual operating state of the rear differential 56 does not coincide with that selected by the vehicle operator through the selector switch 110 when the differential controller 122 is placed in the second or third control state (when the establishment of the LOCK state is inhibited) or when the rear differential 56 is in the transient state (in the process of shifting from the FREE state to the LOCK state, but remaining in the FREE state). When the signal line 140 is disconnected at P2 or P3 while the detector switch 142 is ON, the actual operating state of the rear differential 56 coincides with that selected by the operator, but the light 134 flickers.

Based on the finding described above, the present inventor developed a system for driving or controlling the DIFFERENTIAL LOCK light 134 in one of three modes, namely, a continuously ON mode in which the light 134 is held ON, a continuously OFF mode in which the light 134 is held OFF, and a flickering mode in which the light 134 is alternately turned ON and OFF. This system was developed prior to the present invention (in which a modified system is employed is as described later and was not publicly known at the time the present invention was made.

The system for driving the light 134 uses a rule as indicated in FIG. 7, for selecting one of the three driving modes. To drive the light 134 in one of the three modes, the transistor 148 is driven in an appropriate one of three modes. That is, the light 134 is held ON by holding the transistor 148 in the ON state, and is held OFF by holding the transistor 148 in the OFF state. The light 134 is alternately turned ON and OF or controlled to flicker by alternately turning ON and OFF the transistor. In the flickering mode, the transistor 148 is held ON for 0.5 second to hold the light 134 ON for 0.5 second, and then the transistor 148 is held OFF for 0.5 second to hold the light 134 OFF for 0.5 second. The transistor 148 is repeatedly turned ON and OFF alternately to repeatedly turn ON and OFF the transistor 148 alternately.

The rule for driving the transistor 148 and the DIFFERENTIAL LOCK light 134 will be described by reference to FIG. 7.

When the differential control device (differential control unit 120) is placed in the first control state, that is, when the DIFFERENTIAL LOCK selector switch 110 is OFF, the transistor 148 is held OFF to hold OFF the light 134, irrespective of whether the monitor voltage is in the HIGH or LOW range. If the system is normal, that is, if there are no defects in the elements associated with the detection of the operating state of the rear differential 56, the monitor voltage is in the HIGH range when the detector switch 142 is OFF. In this case, the light 134 is held OFF, informing the vehicle operator that the rear differential 56 is placed in the FREE state.

If the dog clutch 87 is stuck in the fully engaged state and remains in the LOCK state, the detector switch 142 remains ON and the monitor voltage remains in the LOW range even when the selector switch 110 is OFF (even in the first control state). In this case where the system is abnormal, the detector switch 142 remains ON, and the light 134 remains ON even while the transistor 148 is OFF. Thus, the light 134 informs the operator that the rear differential 56 is in the LOCK state.

When the differential control unit 120 is placed in the second control state, that is, when the selector switch 110 is ON while the L4 detector switch 62 is OFF with the transfer 60 placed in the H2 or H4 drive state, the detector switch 142 is OFF and the monitor voltage is in the HIGH range if the system is normal. In this case, the transistor 148 is alternately turned ON and OFF to drive the light 134 in the flickering mode. In each ON-OFF cycle of the transistor 148, the transistor 148 is held ON for 0.5 second and then OFF for 0.5 second.

The flickering light 134 informs the operator that the rear differential 56 is not placed in the LOCK state but remains in the FREE state, even after the selector switch 110 has been turned ON by the operator. Namely, the operator knows that the currently established operating state of the rear differential 56 is different from the operating state which the operator has selected through the selector switch 110.

If the system is abnormal, and the monitor voltage is in the HIGH range, the transistor 148 remains OFF. However, the light 134 remains ON since the detector switch 142 remains ON.

When the differential control unit 120 is placed in the third control state, the detector switch 142 is OFF and the monitor voltage is in the HIGH range if the system is normal. In this case, the transistor 148 is alternately turned ON and OFF to cause the light 134 to flicker, informing the operator that the currently established operating state of the rear differential 56 does not coincide with the operating state selected by the operator. The third control state is established in the following two cases: the first or second control state was established in the last control cycle, and the selector switch 110 and the detector switch 142 are both ON while the vehicle speed is in the HIGH range; and the third control state was established also in the last control cycle.

If the system is abnormal, and the monitor voltage is in the LOW range, the transistor 148 remains ON. However, the light 134 remains ON since the detector switch 142 remains ON.

When the differential control unit 120 is placed in the fourth control state, the detector switch 142 is ON and the monitor voltage is in the LOW range if the system is normal. In this case, the transistor 148 is held OFF to hold the light 134 ON, informing the operator that the rear differential 56 is placed in the LOCK state. The fourth control state was established in the following two cases: the fifth control state was established in the last control cycle, and the selector switch 110 and the detector switch 142 are both ON while the vehicle speed is in the HIGH range; and the fourth control state was established also in the last control cycle.

If the system is abnormal, that is, if the full engagement of the dog clutch 87 is delayed, or if the primary signal line 140 is disconnected at P2 or P3, for example, the monitor voltage is in the HIGH range, and the transistor 148 is alternately turned ON and OFF to cause the light 134 to flicker, informing the operator that the currently established operating state of the rear differential 56 does not coincide with the operating state selected by the operator, or that the primary signal line 140 is disconnected (the monitor voltage does not correspond to the output signal of the selector switch 110).

When the differential control unit 120 is placed in the fifth control state, that is, when the selector switch 110 and the detector switch 62 are both ON while the vehicle speed is in the LOW range, the detector switch 142 is ON and the monitor voltage is in the LOW range, if the system is normal. In this case, the transistor 148 is held OFF to hold the light 134 ON, informing the operator that the rear differential 56 is placed in the LOCK state.

If the system is abnormal with the delayed full engagement of the dog clutch 87 or disconnection of the signal line 140, the monitor voltage is in the HIGH range, and the transistor 148 is turned alternately ON and OFF to cause the light 134 to flicker, informing the operator that the currently established operating state of the rear differential 56 does not coincide with the operating state selected by the operator, or that the primary signal line 140 is disconnected (the monitor voltage does not correspond to the output signal of the selector switch 110).

When the transfer 60 is placed in the L4 drive position, the differential actions between the front and rear wheels 50, 54 are substantially inhibited, that is, the front and rear wheels 50, 54 are not permitted to have different rotating speeds. When the rear differential 56 is placed in the LOCK state, the differential actions between the right and left rear wheels 50 are substantially inhibited, that is, the right and left rear wheels 50 are not permitted to have different rotating speeds. Therefore, there is a possibility that the rear wheels 54 cannot be suitably braked in the anti-lock mode under the control of the anti-lock brake pressure control device when the transfer 60 is placed in the L4 drive state and/or when the rear differential 56 is placed in the LOCK state.

In view of the above possibility, the vehicle control system according to the present embodiment is adapted such that the anti-lock brake pressure control device is permitted to operate concurrently with the differential control device, when the differential control unit 120 is placed in the first, second or third control state, that is, when the rear differential 56 is placed in the FREE state, and such that the anti-lock brake pressure control device is inhibited from operating to perform the anti-lock brake pressure control operation when the differential control unit 120 is placed in the fourth or fifth control state, that is, when the transfer 60 is placed in the L4 drive state while the rear differential 56 is placed in the LOCK state, as indicated in FIG. 5. In the latter case, the operation of the anti-lock brake pressure control device concurrently with the operation of the differential control device is considered inadequate for stable running of the vehicle, and the anti-lock brake pressure control device is inhibited from operating to perform the anti-lock brake pressure operation in the normal mode when the transfer 60 is in the L4 drive state while the rear differential 56 is in the LOCK state, as indicated in the table of FIG. 5.

Based on the fact that the operating state of the DIFFERENTIAL LOCK light 134 varies depending upon the operating state of the rear differential 56, the present embodiment is further adapted such that a signal indicative of the operating state of the light 134 is applied to the brake control unit 30 to determine whether the anti-lock pressure control operation in the normal mode should be inhibited or not, that is, whether the anti-lock brake pressure control device is inhibited from operating to control the hydraulic pressures in the wheel brake cylinders 20 in the anti-lock mode or fashion. To this end, a second secondary signal line 152 is connected at one end thereof to a portion of the primary signal line 140 between the detector switch 142 and the point of connection of the primary signal line 140 and the first secondary signal line 146. The second secondary signal line 152 is connected at the other end to the brake control unit 30. In this arrangement, the signal indicative of the operating state (continuously ON or OFF state or flickering state) of the DIFFERENTIAL LOCK light 134 is supplied to the brake controller 32.

According to the rule of FIG. 7 previously developed by the present inventor before the present invention was made, the DIFFERENTIAL LOCK light 134 is held OFF while the rear differential 56 is placed in the FREE state with the DIFFERENTIAL LOCK selector switch 110 held OFF. When the rear differential 56 is brought to the LOCK state according to an operation of the selector switch 110 by the operator to select the LOCK state, the light 134 is turned ON and remains ON as long as the rear differential 56 is held in the LOCK state. On the basis of the signal indicative of the operating state of the light 134, the brake controller 32 can determine that the rear differential 56 is placed in the FREE state as long as the signal received through the line 152 indicates that light 134 is OFF, that is, can determine that the anti-lock brake pressure control operation should be permitted as long as the signal indicates that the light 134 is OFF. The brake controller 32 can determine that the rear differential 56 is placed in the LOCK state and the anti-lock brake pressure control operation in the normal manner should be inhibited as long as the signal indicates that the light 134 is ON.

However, the rule of FIG. 7 has a drawback that the light 134 is controlled to flicker in the same ON-OFF pattern when the differential control unit 120 is placed in the second or third control state, and when it is placed in the fourth or fifth control state while the rear differential 56 is in the transient state or while the primary signal line 140 is disconnected at P2 or P3.

Therefore, the signal received through the signal line 152 does not permit the brake control unit 30 to distinguish the case where the establishment of the LOCK state of the rear differential 56 is inhibited in the second or third control state, from the case where the rear differential 56 is in the transient state or where the primary signal line 140 is disconnected.

The table of FIG. 8 indicates a relationship between the pattern of the voltage signal applied to the brake controller 32 through the secondary signal line 152, and a result of the determination as to whether the anti-lock brake pressure control operation of the anti-lock brake pressure control device in the normal manner or mode should be permitted or inhibited, where the determination is effected according to two different standards.

According to the first standard, the anti-lock brake pressure control device is permitted to perform the anti-lock brake pressure control operation if the voltage is held higher than a predetermined threshold for 0.7 second or more, while the anti-lock brake pressure control device is inhibited from operating to perform the anti-lock brake pressure control operation if the voltage is held lower than the predetermined threshold for 0.2 second or more. When the rear differential 56 is placed in the FREE state with the selector switch 110 held OFF, the voltage signal has a pattern as indicated in the second row of the table of FIG. 8 (as counted from the top), and the brake controller 32 determines that the anti-lock brake pressure control device should be permitted to perform the anti-lock brake pressure control operation. When the rear differential 56 is placed in the LOCK state, the voltage signal has a pattern as indicated in the fourth or lowermost row, and the brake controller 32 determines that the anti-lock brake pressure control device should be inhibited from operating to perform the anti-lock brake pressure control operation. When the rear differential 56 is inhibited from being placed in the LOCK state or placed in the transient state or when the primary signal line 140 is disconnected, the voltage signal has a pattern as indicated in the third row, and the brake controller 32 determines that the operation of the anti-lock brake pressure control device should be inhibited.

When the rear differential 56 is inhibited from being placed in the LOCK state, that is, when the differential control unit 120 is placed in the second or third control state, it is desirable to permit the anti-lock brake pressure control operation. According to the first standard, however, the operation of the anti-lock brake pressure control device is undesirably inhibited when the rear differential 56 is inhibited from being placed in the LOCK state.

According to the second standard, the anti-lock brake pressure control device is permitted to perform the anti-lock brake pressure control operation if the voltage is held higher than the predetermined threshold for 0.2 second or more, while the anti-lock brake pressure control device is inhibited from operating to perform the anti-lock brake pressure control operation if the voltage is held lower than the predetermined threshold for 0.7 second or more. This second standard provides the same result of determination as the first standard, when the rear differential 56 is placed in the FREE state with the selector switch 110 held OFF, and when the rear differential 56 is placed in the LOCK state. When the rear differential 56 is inhibited from being placed in the LOCK state or placed in the transient state or when any of the signal lines 140, 146, 152 are disconnected, the result of the determination according to the second standard is different from that according to the first standard. Namely, the anti-lock brake pressure control device is permitted in the above cases.

When the rear differential 56 is in the transient state or when any of the signal lines 140, 146, 152 is disconnected, it is desirable to inhibit the anti-lock brake pressure control operation. According to the second standard, however, the anti-lock brake pressure control device is undesirably inhibited from operating to perform the anti-lock brake pressure control operation in these cases.

According to the arrangement of FIG. 7 wherein the DIFFERENTIAL LOCK light 134 is operated to flicker in the same ON-OFF pattern (i.e., held ON for 0.5 second and OFF for 0.5 second) when the establishing of the LOCK state of the rear differential 56 is inhibited, and when the rear differential 56 is in the transient state or when any of the signal lines 140, 146, 152 is disconnected at P2 or P3. Accordingly, the application of the signal indicative of the operating state of the light 134 to the brake controller 32 does not permit the brake controller 32 to effect adequate determination as to whether the anti-lock brake pressure control operation of the anti-lock brake pressure control device should be permitted or inhibited.

In the light of the above drawback, the differential control unit 120 of the present vehicle control device is arranged to control the DIFFERENTIAL LOCK light 134 according to a routine as indicated in the flow chart of FIG. 9. A control program for executing this routine is stored in the ROM 126 of the brake controller 32 of the brake control unit 120, and the routine is formulated in an effort to control the light 134 so that the light 134 permits distinction between case where the establishment of the LOCK state of the rear differential 56 is inhibited and the case where the rear differential 56 is in the transient state or where any of the signal lines 140, 146, 152 is disconnected. The routine of FIG. 9 does not require any modification or change of the hardware such as the number of the signal lines.

The routine of FIG. 9 is initiated with step S11 in which the CPU 124 of the differential controller 122 receives the output signals of the DIFFERENTIAL LOCK selector switch 110, L4 detector switch 62 and vehicle speed sensor 112, and the signals indicative of the monitor 25 voltage (output of the monitor 150) and the control state of the differential control unit 120 in the last cycle of execution of the routine.

Then, the control flow goes to step S12 to select one of the three driving modes of the DIFFERENTIAL LOCK light 134, according to the input signals.

The system for driving the light 134 uses a rule as indicated in FIG. 10, for selecting one of the three driving modes, i.e., continuously ON mode, continuously OFF mode and flickering mode. This rule of FIG. 10 is more or less similar to that of FIG. 7. In the interest of brevity and simplification, only those portions of the rule of FIG. 10 which are different from the rule of FIG. 7 will be described in detail.

When the differential control device 120 is placed in the second or third control state, that is, when the establishment of the LOCK state of the rear differential 56 is inhibited, the differential actuator 94 or dog clutch 87 is rarely stuck in the position corresponding to the LOCK state, and the monitor voltage is usually in the HIGH range. In this case, the transistor 148 is alternately turned ON and OFF such that it is ON for 0.2 second and OFF for 1.1 second.

When the differential control device 120 is placed in the fourth or fifth control state and the full engagement of the dog clutch 87 is delayed or any of the signal lines 140, 146, 152 is disconnected, the monitor voltage is in the HIGH range. In this case, the transistor 148 is alternately turned ON and OFF such that it is ON for 0.7 second and OFF for 0.3 second.

As indicated in FIGS. 10 and 11, the DIFFERENTIAL LOCK light 134 is driven in a first flickering mode such that the light 134 is ON for 0.2 second and OFF for 1.1 second, when the differential control unit 120 is placed in the first control state and the system is normal, or when the unit 120 is placed in the second or third state and the system is normal. When the unit 120 is placed in the fourth or fifth control mode and the system is abnormal, the light 134 is driven in a second flickering mode such that the light 134 is ON for 0.7 second and OFF for 0.3 second. When the unit 120 is placed in the first, second or third control mode and the system is abnormal, or when the unit 120 is placed in the fourth or fifth control mode and the system is normal, the light 134 is held ON.

As described above, the light 134 is alternately turned ON and OFF in the first flickering mode such that it is ON for 0.2 second and OFF for 1.1 second, when the establishment of the LOCK state of the rear differential 56 is inhibited. On the other hand, the light 134 is alternately turned ON and OFF in the second flickering mode such that it is ON for 0.7 second and OFF for 0.3 second, when the differential control unit 120 is placed in the fourth or fifth control mode while the rear differential 56 is in the transient state (in the process of shifting to the LOCK state) or while any of the signal lines 140, 146, 152 is disconnected. Thus, the first and second flickering modes have different alternate ON-OFF time patterns, so that these patterns distinguish the case in which the establishment of the rear differential 56 is inhibited, from the case in which the rear differential 56 is in the transient state or any of the signal lines 140, 146, 152 is disconnected.

In the present embodiment, the anti-lock brake pressure control operation of the anti-lock brake pressure control device is permitted if the DIFFERENTIAL LOCK light 134 is held OFF for a time period of 0.5 second or longer, and inhibited if the light 134 is held OFF for a time period of 0.3 second or shorter. According to this arrangement, the anti-lock brake pressure operation is permitted when the rear differential 56 is inhibited from being placed in the LOCK state, and is inhibited when the rear differential 56 is in the transient state or when any of the signal lines 140, 146, 152 is disconnected. Therefore, the present arrangement is effective to avoid undesirable inhibition or execution of the anti-lock brake pressure control operation. This aspect will be described in detail.

Figure 12:
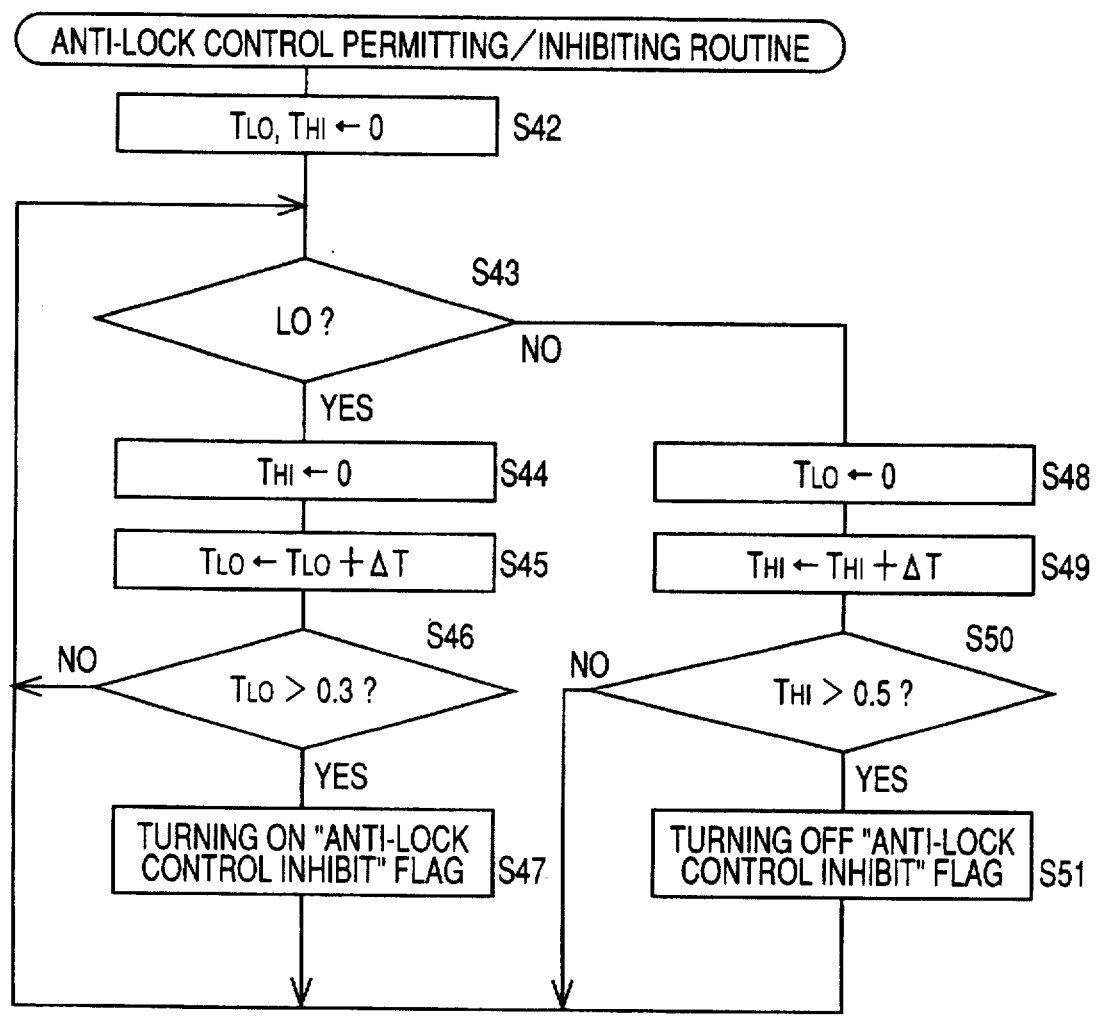
FIG. 12 is a flow chart illustrating a routine for enabling and disabling the anti-lock brake pressure control device to perform an anti-lock brake pressure control operation.
Figure 13:
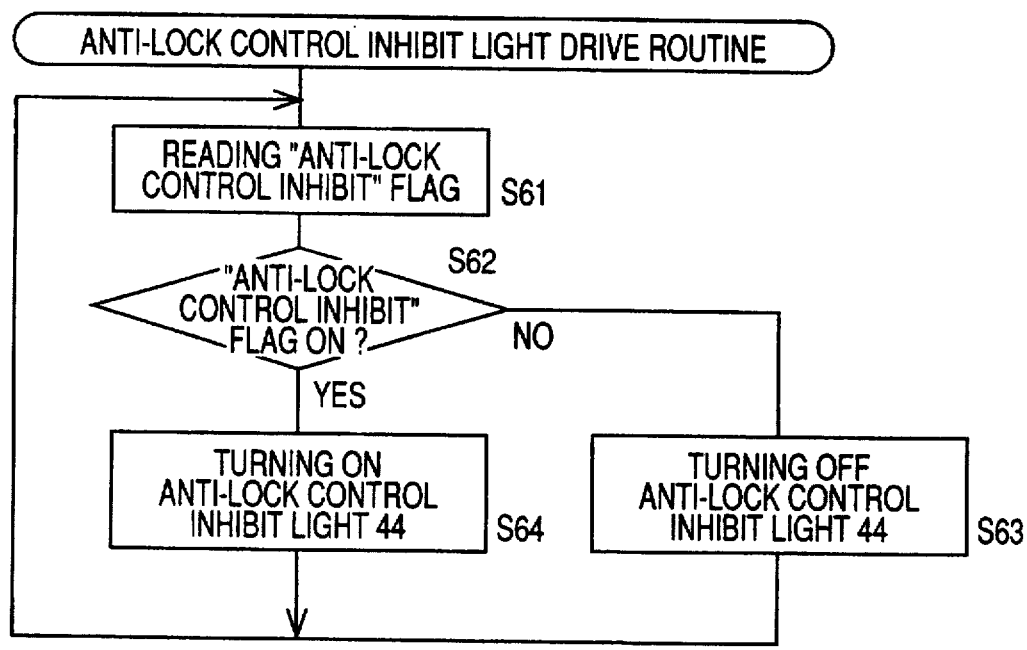
FIG. 13 is a flow chart illustrating a routine for driving an ANTI-LOCK CONTROL INHIBIT light in the anti-lock pressure control device.
Figure 14:
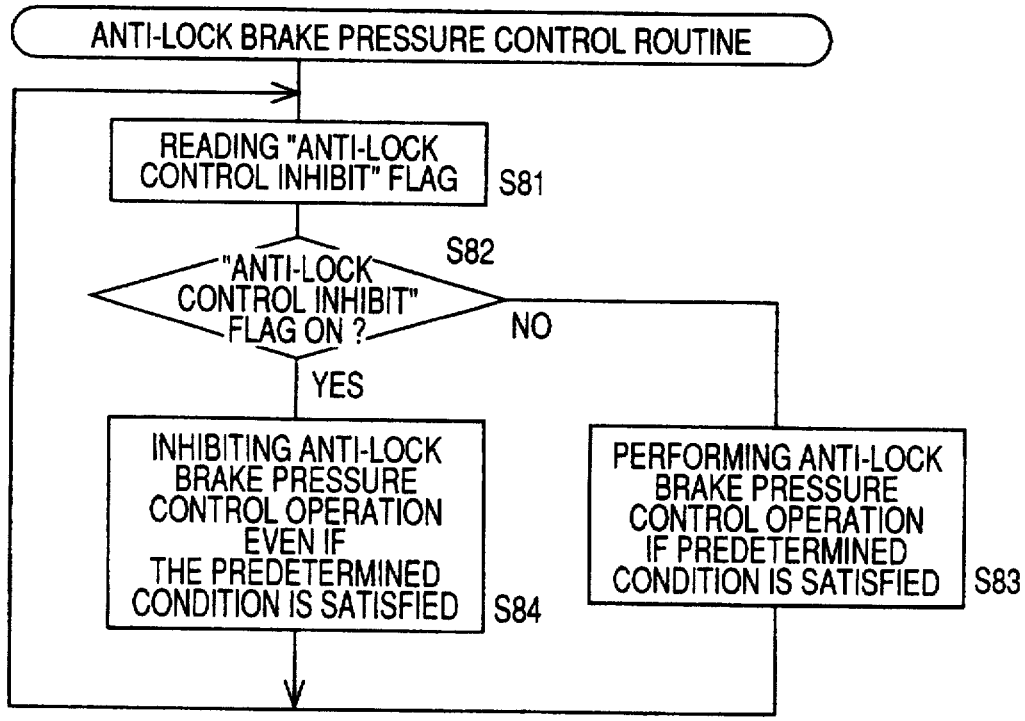
FIG. 14 is a flow chart illustrating an anti-lock brake pressure control routine executed by the anti-lock pressure control device.

To determine whether the anti-lock brake pressure control operation under the control of the brake control unit 30 should be permitted or inhibited, the ROM 36 of the brake controller 32 stores control programs for executing a anti-lock control permitting/inhibiting routine illustrated in the flow chart of FIG. 12, an anti-lock control inhibit light drive routine illustrated in the flow chart of FIG. 13, and an anti-lock brake pressure control routine illustrated in the flow chart of FIG. 14.

The anti-lock control permitting/inhibiting routine of FIG. 12 is initiated with step S42 to reset a low-voltage time $T_{LO}$ and a high-voltage time $T_{HI}$ to zero. These times $T_{LO}$ and $T_{HI}$ are times during which the voltage of the voltage signal received through the second secondary signal line 152 are held lower and higher than a predetermined threshold, respectively, namely, substantially equal to the ground voltage or the voltage of the battery 136, respectively.

If none of the signal lines 140, 146, 152 is disconnected, the voltage of the voltage signal is lower than the threshold (hereinafter referred as "LOW") when the transistor 148 is turned ON to turn ON the DIFFERENTIAL LOCK light 134, and is higher than the threshold (hereinafter referred as "HIGH") when the transistor 148 is turned OFF to turn OFF the light 134. Therefore, the low-voltage time $T_{LO}$ is a time during which the light 134 is held ON, while the high-voltage time $T_{HI}$ is a time during which the light 134 is held OFF.

Step S42 is followed by step S43 to determine whether the voltage of the received voltage signal is LOW. If an affirmative decision (YES) is obtained in step S43, the control flow goes to step S44 and the following steps. Step S44 is provided to reset the high-voltage time $T_{HI}$ to zero. This step has a significance after the voltage of the voltage signal is turned from LOW to HIGH and steps S48 and the following steps are implemented. That is, step S44 is provided to assure that the high-voltage time $T_{HI}$ is zeroed before the voltage is turned to HIGH.

Then, the control flow goes to step S45 to increment the low-voltage time $T_{LO}$ by a predetermined increment $\Delta T$ (which is equal to the cycle time of the present routine). Step S45 is followed by step S46 to determine whether the low-voltage time $T_{LO}$ has exceeded 0.3 second. If a negative decision (NO) is obtained in step S46, the control flow goes back to step S43. When an affirmative decision (YES) is obtained in step S46 after repeated implementation of steps S43–S46, the control flow goes to step S47 to turn ON an ANTI-LOCK CONTROL INHIBIT flag. The ANTI-LOCK CONTROL INHIBIT flag is provided in the RAM 38. When this flag is ON, it indicates that the anti-lock brake pressure control operation of the anti-lock brake pressure control device is inhibited. When the flag is OFF, it indicates that the anti-lock brake pressure control operation is permitted. The flag is reset to OFF when power is applied to the computer 39.

Thus, step S47 is provided to determine that the anti-lock brake pressure control operation should be inhibited, if the voltage signal has an ON-OFF time pattern as indicated in the fourth or fifth row (as counted from the top) of the table of FIG. 15. The voltage signal has the ON-OFF time pattern as indicated in the fourth row of the table when the differential control unit 120 is placed in the fourth or fifth control state wand when the rear differential 56 is in the transient stage or when any the signal lines 140, 146, 152 is disconnected. This means that the anti-lock brake pressure control operation is inhibited when the rear differential 56 is in the transient state or when any of the signal lines 140, 146, 152 is disconnected.

If the voltage of the voltage signal is HIGH, a negative decision (NO) is obtained in step S43, and the control flow goes to step S48 and the following step. In step S48, the low-voltage time $T_{LO}$ is reset to zero, like the high-voltage time $T_{HI}$ reset in step S44. Step S48 is followed by step S49 to increment the high-voltage time $T_{HI}$ by the predetermined increment $\Delta T$. Then, step S50 is implemented to determine whether the high-voltage time $T_{HI}$ has exceeded 0.5 second. If a negative decision (NO) is obtained in step S50, the control flow goes back to step S43. When an affirmative decision (YES) is obtained in step S50 after repeated implementation of steps S43 and S48–S50, an affirmative decision (YES) is obtained in step S50, and the control flow goes to step S51 to turn OFF the ANTI-LOCK CONTROL INHIBIT flag.

Thus, step S51 is provided to determine that the anti-lock brake pressure control operation should be permitted, if the voltage signal has an ON-OFF time pattern as indicated in the second row of the table of FIG. 15. The voltage signal has the ON-OFF time pattern as indicated in the second row of the table when the establishment of the LOCK state of the rear differential 56 is inhibited. This means that the anti-lock brake pressure control operation is permitted when the establishment of the LOCK state is inhibited.

The anti-lock control inhibit light drive routine of FIG. 13 is initiated with step S61 to read the ANTI-LOCK CONTROL INHIBIT flag in the RAM 38. Then, step S62 is implemented to determine whether the ANTI-LOCK CONTROL INHIBIT flag is ON or not. If a negative decision (NO) is obtained in step S62, the control flow goes to step S63 to turn OFF the ANTI-LOCK CONTROL INHIBIT light 44. If an affirmative decision (YES) is obtained in step S62, the control flow goes to step S64 to turn ON the light 44 to inform the vehicle operator that the anti-lock brake pressure control operation is inhibited.

The anti-lock brake pressure control routine of FIG. 14 is initiated with step S81 to read the ANTI-LOCK CONTROL INHIBIT flag in the RAM 38. Then, step S82 is implemented to determine whether the ANTI-LOCK CONTROL INHIBIT flag is ON or not. If a negative decision (NO) is obtained in step S82, the control flow goes to step S83 to perform the anti-lock brake pressure control operation in a predetermined normal fashion if a predetermined condition for initiating this operation is satisfied. If an affirmative decision (YES) is obtained in step S82, the control flow goes to step S84 to inhibit the anti-lock brake pressure control operation even if the predetermined condition is satisfied.

Referring next to FIGS. 16 and 17, there will be described in detail a manner of determination as to whether the anti-lock brake pressure control operation should be permitted or inhibited, when the differential control unit 120 is placed in the fourth or fifth control state.

The determination as to whether the anti-lock brake pressure control operation should be permitted or inhibited in the fourth or fifth control state of the differential control unit 120 depends on whether the DIFFERENTIAL LOCK detector switch 142 is ON or not (whether the rear differential 56 is placed in the LOCK state or not), whether any of the signal lines 140, 146, 152 is disconnected, whether the rear differential 56 is in the transient state or not (in the process of shifting to the LOCK state or not) if none of the signal lines 140, 146, 152 is disconnected, and the location of disconnection of the signal lines 140, 146, 152.

The table of FIG. 16 indicates the cases of determination, where the differential control unit 120 is placed in the fourth or fifth control state while the detector switch 142 is OFF with the rear differential 56 placed in the FREE state (or in the transient state), depending upon whether any of the signal lines 140, 146, 152 is disconnected, and depending upon the location of disconnection of the signal lines. On the other hand, the table of FIG. 17 indicates the cases of determination, when the differential control unit 120 is placed in the fourth or fifth control unit while the detector switch 142 is ON with the rear differential 56 placed in the LOCK state, also depending upon whether any of the signal lines 140, 146, 152 is disconnected and the location of disconnection of the signal lines.

In the table of FIG. 16, the fourth column indicates the cases where the DIFFERENTIAL LOCK selector switch 110 is ON, while the third column indicates the cases where the selector switch 110 is OFF, for reference. In the table of FIG. 17, the third column indicates the cases where the selector switch 110 is ON, while the fourth column indicates the cases where the selector switch 110 is OFF, for reference.

Referring to the table of FIG. 16, there will first be described the cases where the differential control unit 120 is in the fourth or fifth control state while the detector switch 142 is OFF with the rear differential 56 placed in the FREE state (transient state).

When none of the signal lines 140, 146 152 is disconnected, the monitor voltage is in the HIGH range with the detector switch 142 being OFF. Since the fourth or fifth control state is established, the DIFFERENTIAL LOCK light 134 is held ON for 0.7 second, and the low-voltage time $T_{LO}$ of the voltage signal applied to the brake control unit 30 is equal to 0.7 second. Since this low-voltage time $T_{LO}$ of 0.7 second is longer than the threshold time of 0.3 second for inhibiting the anti-lock brake pressure control operation, the brake controller 32 determines that the anti-lock brake pressure control operation should be inhibited.

Then, the cases where any of the signal lines 140, 146, 152 is disconnected will be described.

When the primary signal line 140 is disconnected at position P1, that is, between the light 134 and the point of connection of the primary signal line 140 and the second secondary signal line 146 (which point of connection is located between the light 134 and the point of connection of the primary signal line 140 and the second secondary line 152), the battery 136 and the brake control unit 30 are disconnected from each other, and the voltage of the voltage signal received by the unit 30 is held LOW for a time period of 0.3 second or longer. In this case, therefore, the brake controller 32 determines that the anti-lock brake pressure control operation should be inhibited.

When the primary signal line 140 is disconnected at position P2, that is, between the points of connection of the primary signal line 140 and the first and second secondary signal lines 146, 152, the light 134 is driven in the second flickering mode, and the low-voltage time $T_{LO}$ of the voltage signal as generated from the monitor 150 is equal to 0.7 second. However, since the first secondary signal line 146 and the brake control unit 30 are disconnected from each other, the voltage of the voltage signal as received by the brake control unit 30 is held LOW for a time period of 0.3 second or longer. In this case, the brake controller 32 determines that the anti-lock brake pressure control operation should be inhibited.

When the primary signal line 140 is disconnected at position P3 between the detector switch 142 and the point of connection of the primary signal line 140 and the second secondary signal line 150, the light 134 is driven in the second flickering mode, and the low-voltage time $T_{LO}$ of the voltage signal as generated from the monitor 150 is equal to 0.7 second. In this case, the first secondary signal line 146 is connected to the second secondary signal line 152 through a portion of the primary signal line 140, the low-voltage time $T_{LO}$ of the voltage signal as received by the brake control unit 30 is equal to 0.7 second, which is longer than the threshold of 0.3 second. therefore, the brake controller 32 determines that the anti-lock brake pressure control operation should be inhibited.

When the second secondary signal line 152 is disconnected at position P4, the transistor 148 and the battery 136 are connected to each other, and the light 134 is held ON for 0.7 second, whereby the low-voltage time $T_{LO}$ of the voltage signal as generated by the monitor 150 is 0.7 second. However, since the battery 136 and the brake control unit 30 are disconnected from each other, the voltage of the voltage signal as received by the brake control unit 30 is held zero for a time period of 0.3 second or longer. Therefore, the brake controller 32 determines that the anti-lock brake control operation should be inhibited.

When the first secondary signal line 146 is disconnected at position P5, the light 134 and the transistor 148 are disconnected from each other, and the light 134 is held OFF. Further, since the battery 136 and the brake control unit 30 are connected to each other, the high-voltage time $T_{HI}$ of the voltage signal as received by the unit 30 is 0.5 second or longer, whereby the brake controller 32 determines that the anti-lock brake pressure control operation should be permitted.

Referring next to the table of FIG. 17, there will be described the cases where the differential control unit 120 is placed in the fourth or fifth control state while the DIFFERENTIAL LOCK detector switch 132 is ON with the rear differential 56 placed in the LOCK state.

When none of the signal lines 140, 146 152 is disconnected, the light 134 is held ON, and the low-voltage time $T_{LO}$ of the voltage signal as received by the brake control unit 30 is equal to 0.7 second or longer, which is longer than the threshold of 0.3 second. In this case, therefore, the brake controller 32 determines that the anti-lock brake pressure control operation should be inhibited.

Then, the cases where any of the signal lines 140, 146, 152 is disconnected while the detector switch 142 is ON will be described.

When the primary signal line 140 is disconnected at position P1, that is, between the light 134 and the point of connection of the primary signal line 140 and the second secondary signal line 146 (which point of connection is located between the light 134 and the point of connection of the primary signal line 140 and the second secondary line 152), the battery 136 and the brake control unit 30 are disconnected from each other, and the voltage of the voltage signal received by the unit 30 is held LOW for a time period of 0.3 second or longer. In this case, therefore, the brake controller 32 determines that the anti-lock brake pressure control operation should be inhibited.

When the primary signal line 140 is disconnected at position P2, that is, between the points of connection of the primary signal line 140 and the first and second secondary signal lines 146, 152, the light 134 is driven in the second flickering mode, and the low-voltage time $T_{LO}$ of the voltage signal as generated from the monitor 150 is equal to 0.7 second. However, since the first secondary signal line 146 and the brake control unit 30 are disconnected from each other, the voltage of the voltage signal as received by the brake control unit 30 is held LOW for a time period of 0.3 second or longer. In this case, the brake controller 32 determines that the anti-lock brake pressure control operation should be inhibited.

When the primary signal line 140 is disconnected at position P3 between the detector switch 142 and the point of connection of the primary signal line 140 and the second secondary signal line 150, the light 134 is driven in the second flickering mode, and the low-voltage time $T_{LO}$ of the voltage signal as generated from the monitor 150 is equal to 0.7 second. In this case, the first secondary signal line 146 is connected to the second secondary signal line 152 through a portion of the primary signal line 140, the low-voltage time $T_{LO}$ of the voltage signal as received by the brake control unit 30 is equal to 0.7 second, which is longer than the threshold of 0.3 second, therefore, the brake controller 32 determines that the anti-lock brake pressure control operation should be inhibited.

When the second secondary signal line 152 is disconnected at position P4, the transistor 148 and the battery 136 are connected to each other, and the light 134 is held ON, whereby the low-voltage time $T_{LO}$ of the voltage signal as generated by the monitor 150 is 0.7 second or longer. However, since the battery 136 and the brake control unit 30 are disconnected from each other, the voltage of the voltage signal as received by the brake control unit 30 is held zero for a time period or duration of 0.3 second or longer. Therefore, the brake controller 32 determines that the anti-lock brake control operation should be inhibited.

When the first secondary signal line 146 is disconnected at position P5, the light 134 and the transistor 148 are disconnected from each other, and the light 134 is held OFF. Further, since the battery 136 and the brake control unit 30 are connected to each other, the high-voltage time $T_{HI}$ of the voltage signal as received by the unit 30 is 0.3 second or longer, whereby the brake controller 32 determines that the anti-lock brake pressure control operation should be inhibited.

It will be understood from the foregoing explanation that the voltage signal received by the brake control unit 30 is alternately made HIGH and LOW in the following cases, as shown in FIGS. 11, 16 and 17: case I where the differential control unit 120 is placed in one of the second and third control states; case II where the differential control unit 120 is placed in the fourth control state while the rear differential 56 is in the transient state or while the primary signal line 140 is disconnected at position P3; and case III where the differential control unit 120 is placed in the fifth control mode while the rear differential 56 is in the transient state or while the primary signal line 140 is disconnected at position P3. However, the ON-OFF time pattern of the voltage signal in the case I is different from those in the cases II and III, whereby the brake controller 32 can distinguish the cases I and II from the case III by the ON-OFF time pattern of the voltage signal. In the case I, the anti-lock brake pressure control operation is permitted to be performed in the predetermined normal fashion if the predetermined condition for initiating the operation is satisfied. In the cases II and III, the anti-lock brake pressure control operation in the predetermined normal fashion is inhibited even if the predetermined condition for initiating the operation is satisfied.

In the present vehicle control system, the determination as to whether the anti-lock brake pressure control operation should be permitted or inhibited is suitably effected in relation to the operating condition of the rear differential 56 and the rear differential control device which includes the control unit 120. The present system is effective to avoid undesirable execution or inhibition of the anti-lock brake pressure control operation.

It will be understood from the above description of the present embodiment of the invention that portions of the differential control unit 120 assigned to execute the differential lock light drive routine of FIG. 9 and store and read the rule of FIG. 10 and a portion of the brake control unit 30 assigned to execute the anti-lock control permitting/inhibiting routine of FIG. 12 cooperate to constitute wheel rotation control determining means for determining whether the operation of a wheel rotation control device in a predetermined normal manner or mode should be permitted or inhibited. It will also be understood that a portion of the brake control unit 30 assigned to implement step S84 of FIG. 14 constitutes normal operation inhibiting means for inhibiting at least one of the normal operation of the wheel rotation control device in the predetermined normal manner and the normal operation of the differential control device to control said differential in a predetermined normal manner.

In the illustrated embodiment, the anti-lock brake pressure control operation is inhibited if the rear differential 56 is in the transient state or if the primary signal line 140 is disconnected at position P3, without a distinction of these cases, since the distinction is not necessary for determining whether the anti-lock brake pressure control operation should be permitted or inhibited. However, if the distinction of these cases is necessary, it may be achieved in the following manner.

For instance, the disconnection of the primary signal line 140 at position P3 can be recognized where the voltage of the voltage signal as generated by the monitor 148 is in the HIGH range when no delay of the full engagement of the dog clutch 87 is expected after a predetermined time of continuous running of the vehicle.

On the other hand, the condition in which the rear differential 56 is in the transient state can be recognized where the voltage of the voltage signal as generated by the monitor 148 is in the HIGH range when disconnection determining means has determined that the primary determines that the primary signal line 140 is not disconnected at position P3.

While the present invention has been described in detail by reference to the accompanying drawings, it is to be understood that the invention may be embodied with various other changes, modifications and improvements, which may occur to those skilled in the art, without departing from the spirit and scope of the invention defined in the following claims.

What is claimed is:

1. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential device, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels, and a differential controller for controlling said actuator on the basis of said outputs of said operator-controlled input means and said vehicle condition detecting means;

a wheel rotation control device for controlling rotation of said controllable wheels;

differential state detecting means for generating an output indicative of an operating state of each of said at least one differential; and wheel rotation control determining means for determining, on the basis of said outputs of said differential state detecting means, said input means and said vehicle condition detecting means, whether a normal operation of said wheel rotation control device in a predetermined normal manner should be permitted or inhibited.

2. A control system according to claim 1, wherein said at least one differential includes a differential having a lock state in which differential actions of said controllable wheels are substantially completely inhibited, and a free state in which said differential actions are substantially completely permitted, and wherein said operator-controlled input means generates a first and a second output signal indicative of desires of the operator to select said lock and free states of said differential, respectively, said differential controller of said differential control device controlling said actuator to selectively place said differential in one of said lock and free states, depending upon said first and second output signals of said input means, said differential controller inhibiting an operation of said differential actuator to place said differential in said lock state even in the presence of said first output signal of said input means, if the condition of the vehicle as indicated by the output of said vehicle detecting means satisfies a predetermined condition, and wherein said wheel rotation control determining means determines, on the basis of said outputs of said differential state detecting means, said input means and said vehicle condition detecting means, that said normal operation of said wheel rotation control device should be permitted, if said differential is placed in said free state even in the presence of said first output signal of said input means indicative of the desire of the operator to select said lock state.

3. A control system according to claim 1, wherein said at least one differential includes a differential having a lock state in which differential actions of said controllable wheels are substantially completely inhibited, and a free state in which said differential actions are substantially completely permitted, said differential controller of said differential control device controlling said actuator to selectively place said differential in one of said lock and free states, and wherein said wheel rotation control determine means determines, on the basis of said outputs of said differential state detecting means, said input means and said vehicle condition detecting means, that said normal operation of said wheel rotation control device should be inhibited, if there exists a possibility that said differential is placed in a transient state in which said differential is in a process of shifting from the currently established free state to said lock state.

4. A control system according to claim 1, further comprising a monitor which is connected through a signal line to said differential state detecting means, for receiving an output signal of said differential state detecting means through said signal line, and wherein said rotation control determining means determines, on the basis of an output of said monitor and said outputs of said input means and said vehicle condition detecting means, that said normal operation of said wheel rotation control device should be inhibited, if there is a possibility of electrical disconnection of said signal line.

5. A control system according to claim 1, further comprising normal operation inhibiting means for inhibiting at least one of said normal operation of said wheel rotation control device in said predetermined normal manner and a normal operation of said differential control device to control said differential in a predetermined normal manner, if said rotation control determining means determines that said normal operation of said wheel rotation control device should be inhibited.

6. A control system according to claim 1, wherein said wheel rotation control device comprises an anti-lock brake pressure control device for controlling braking pressures to be applied to said controllable wheels, so as to prevent locking of said controllable wheels.

7. A control system according to claim 1, wherein said plurality of wheels consists of a right front wheel and a left front wheel connected to each other by a front differential, and a right rear wheel and a left rear wheel connected to each other by a rear differential, said motor vehicle having an engine, and a transfer connected to said engine and said front and rear differentials for distributing a drive torque of said engine to said front and rear differentials, said at least one differential controlled by said differential control device consisting of at least one controllable differential consisting of at least one of said front and rear differentials, and wherein said transfer has (a) at least one of a high-speed four-wheel drive state in which the drive torque of the engine is transmitted to said front and rear differentials at a gear ratio for running the vehicle at a relatively high speed while differential actions between said front and rear wheels are substantially completely inhibited, and a high-speed two-wheel drive state in which the drive torque of the engine is transmitted to only said front or rear differential at a gear ratio for running the vehicle at a relatively high speed while said differential actions are substantially completely permitted, and (b) a low-speed four-wheel drive state in which the drive torque of the engine is transmitted to said front and rear differentials at a gear ratio for running the vehicle at a relatively low speed while said differential actions are substantially completely inhibited.

8. A control system according to claim 7, wherein said operator-controlled input means of said differential control device includes a differential lock selector switch operable by the operator between an OFF state for placing at least one of said at least one controllable differential in a free state in which differential actions between the corresponding right and left wheels are substantially completely permitted, and an ON state for placing said at least one of said at least one controllable differential in a lock state in which said differential actions are substantially completely inhibited, and wherein said vehicle condition detecting means of said differential control device includes a vehicle speed sensor for detecting a running speed of the vehicle, and a low-speed four-wheel drive state detector switch having an ON state when said transfer is placed in said low-speed four-wheel drive state, and an OFF state in which said transfer is not placed in said low-speed four-wheel drive state, said differential state detecting means including a differential lock detector switch having an ON state when said controllable differential is placed in said lock state, and an OFF state when said controllable differential is placed in said free state.

9. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential device, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels, and a differential controller for controlling said actuator on the basis of said outputs of said operator-controlled input means and said vehicle condition detecting means;

a wheel rotation control device for controlling rotation of said controllable wheel;

differential state detecting means for generating an output indicative of an operating state of each of said at least one differential;

wheel rotation control determining means for determining, on the basis of said outputs of said differential state detecting means, said input means and said vehicle condition detecting means, whether a normal operation of said wheel rotation control device in a predetermined normal manner should be permitted or inhibited;

wherein said plurality of wheels consists of a right front wheel and a left front wheel connected to each other by a front differential, and a right rear wheel and a left rear wheel connected to each other by a rear differential, said motor vehicle having an engine, and a transfer connected to said engine and said front and rear differentials for distributing a drive torque of said engine to said front and rear differentials, said at least one differential controlled by said differential control device consisting of at least one controllable differential consisting of at least one of said front and rear differentials;

and wherein said transfer has (a) at least one of a high-speed four-wheel drive state in which the drive torque of the engine is transmitted to said front and rear differentials at a gear ratio for running the vehicle at a relatively high speed while differential actions between said front and rear wheels are substantially completely inhibited, and a high-speed two-wheel drive state in which the drive torque of the engine is transmitted to only said front or rear differential at a gear ratio for running the vehicle at a relatively high speed while said differential actions are substantially completely permitted, and (b) a low-speed four-wheel drive state in which the drive torque of the engine is transmitted to said front and rear differentials at a gear ratio for running the vehicle at a relatively low speed while said differential actions are substantially completely inhibited;

wherein said operator-controlled input means of said differential control device includes a differential lock selector switch operable by the operator between an OFF state for placing at least one of said at least one controllable differential in a free state in which differential actions between the corresponding right and left wheels are substantially completely permitted, and an ON state for placing at least one of said at least one controllable differential in a lock state in which said differential actions are substantially completely inhibited, and wherein said vehicle condition detecting means of said differential control device includes a vehicle speed sensor for detecting a running speed of the vehicle, and a low-speed four-wheel drive state detector switch having an ON state when said transfer is placed in said low-speed four-wheel drive state, and an OFF state in which said transfer is not placed in said low-speed four-wheel drive state, said differential state detecting means including a differential lock detector switch having an ON state when said controllable differential is placed in said lock state and an OFF state when said controllable differential is placed in said free state; and a monitor which is connected through a signal line to said differential lock detector switch, for receiving an output signal of said differential lock detector switch through said signal line, and wherein said rotation control determining means comprises means for determining, on the basis of said output signal of said differential lock detector switch, an output of said monitor and said outputs of said low-speed four-wheel drive state detector switch and said vehicle speed sensor, one of (a) a first case where said differential controller of said differential control device inhibits an operation of said differential actuator to place said controllable differential in said lock state even when said differential lock selector switch is placed in said ON state, (b) a second case where there exists a possibility that said controllable differential is in a transient state in which said controllable differential is in a process of shifting from said free state to said lock state, and (c) a third case where there exists a possibility that said signal line is electrically disconnected.

10. A control system according to claim 9, wherein said monitor monitors a voltage of said output signal of said differential lock detector switch, said voltage being lower than a predetermined threshold when said differential lock detector switch is placed in said ON state while said signal line is not electrically disconnected, and being higher than said predetermined threshold when said differential lock detector switch is placed in said OFF state or when said signal line is electrically disconnected.

11. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential device, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels and a differential controller for controlling said actuator on the basis of said outputs of said operator-controlled input means and said vehicle condition detecting means;

a wheel rotation control device for controlling rotation of said controllable wheel;

differential state detecting means for generating an output indicative of an operating state of each of said at least one differential; and wheel rotation control determining means for determining one the basis of said outputs of said differential state detecting means, said input means and said vehicle condition detecting means whether a normal operation of said wheel rotation control device in a predetermined normal manner should be permitted or inhibited;

wherein said at least one differential includes a differential having a lock state in which differential actions of said controllable wheels are substantially completely inhibited, and a free state in which said differential actions are substantially completely permitted, and wherein said operator-controlled input means generates a first and a second output signal indicative of desires of the operator to select said lock and free states of said differential, respectively, said differential controller of said differential control device controlling said actuator to selectively place said differential in one of said lock and free states, depending upon said first and second output signals of said input means, said differential controller inhibiting an operation of said differential actuator to place said differential in said lock state even in the presence of said first output signal of said input means, if the condition of the vehicle as indicated by the output of said vehicle condition detecting means satisfies a predetermined condition;

said control system further comprising:
an electric power source;
a light which is turned on by said electric power source;
a light switch for selectively placing said light in an ON state and an OFF state in which said light is on and off, respectively; and
a light driver operated on the basis of said outputs of said operator-controlled input means, said differential state detecting means and said vehicle condition detecting means, for driving said light through said light switch, such that said light is alternately turned on and off if a desired operating state of said differential as indicated by the output of said input means does not coincide with an actual operating state in which said differential is actually placed, said light driver controlling a drive signal to be applied to said light such that a pattern of said drive signal to alternately turn on and off said light in a first case where said desired and actual operating states do not coincide with each other due to inhibition of the operation of said differential actuator by said differential controller is different from a pattern of said drive signal to alternately turn on and off said light in a second case where said desired and actual operating states do not coincide with each other because said differential is in a process of shifting from said free state to said lock state.

12. A control system according to claim 11, wherein said drive signal has different on-off time patterns in said first and second cases, for changing time durations for which said light is alternately on and off, respectively, between said first and second cases.

13. A control system according to claim 11, wherein said rotation control determining means comprises said light driver, and rotation control judging means for determining, on the basis of said drive signal applied from said light driver to said light, whether said normal operation of said rotation control device should be permitted or inhibited.

14. A control system according to claim 11, further comprising a pr signal line connecting said electric power source to a ground, a first secondary signal line connected to said primary signal line, a monitor signal line connected to said first secondary signal line, and a monitor connected to said monitor signal line, and wherein said light and said differential state detecting means are connected to said primary signal line, in the order of description in a direction from said electric power source toward said ground, said first secondary signal line being connected at one end thereof to a portion of said primary signal line between points of connection thereof to said light and said differential state detecting means, and at the other end to said ground, said light switch being connected to said first secondary signal line, said light switch having an input terminal connected to an output terminal of said light driver, said monitor signal line being connected at one end thereof to a portion of said first secondary signal line between points of connection thereof to said primary signal line and said light switch, and at the other end thereof to an input terminal of said monitor, said monitor having an output terminal connected to an input terminal of said light driver.

15. A control system according to claim 14, further comprising a second secondary signal line which is connected at one end thereof to a portion of said primary signal line between points of connection thereof to said first secondary signal line and said differential state detecting means, and wherein said second secondary signal line is connected at the other end thereof to said rotation control determining means so that said rotation control determining means determines, on the basis of a signal received from said second secondary signal line, whether said normal operation of said rotation control device should be permitted or inhibited.

16. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels, and a differential controller for controlling said actuator on the basis of said outputs of said operator-controlled input means and said vehicle condition detecting means;

a wheel rotation control device for controlling rotation of said controllable wheels;

differential state detecting means for generating an output indicative of an operating state of each of said at least one differential; and normal operation inhibiting means for inhibiting, on the basis of said outputs of said differential state detecting means, said input means and said vehicle condition detecting means, at least one of a normal operation of said wheel rotation control device in a predetermined normal manner and a normal operation of said differential control device to control said differential in a predetermined normal manner, if said normal operation of said wheel rotation control device should be inhibited.

17. A control system according to claim 16, wherein said at least one differential includes a differential having a lock state in which differential actions of said controllable wheels are substantially completely inhibited, and a free state in which said differential actions are substantially completely permitted, and wherein said operator-controlled input means generates a first and a second output signal indicative of desires of the operator to select said lock and free states of said differential, respectively, said differential controller of said differential control device controlling said actuator to selectively place said differential in one of said lock and free states, depending upon said first and second output signals of said input means, said differential controller inhibiting an operation of said differential actuator to place said differential in said lock state even in the presence of said first output signal of said input means, if the condition of the vehicle as indication by the output of said vehicle condition detecting means satisfies a predetermined condition, and wherein said normal operation inhibiting means is operated on the basis of said outputs of said differential state detecting means, said input means and said vehicle condition detecting means, to permit said normal operation of said wheel rotation control device, if said differential is placed in said free state even in the presence of said first output signal of said input means indicative of the desire of the operator to select said lock state.

18. A control system according to claim 16, wherein said at least one differential includes a differential having a lock state in which differential actions of said controllable wheels are substantially completely inhibited, and a free state in which said differential actions are substantially completely permitted, said differential controller of said differential control device controlling said actuator to selectively place said differential in one of said lock and free states, and wherein said normal operation inhibiting means is operated on the basis of said outputs of said differential state detecting means, said input means and said vehicle condition detecting means, to inhibit said normal operation of said wheel rotation control device, if said there exists a possibility that said differential is placed in a transient state in which said differential is in a process of shifting from the currently established free state to said lock state.

19. A control system according to claim 16, further comprising a monitor which is connected through a signal line to said differential state detecting means, for receiving an output signal of said differential state detecting means through said signal line, and wherein said normal operation inhibiting means is operated on the basis of an output of said monitor and said outputs of said input means and said vehicle condition detecting means, to inhibit said normal operation of said wheel rotation control device, if there is a possibility of electrical disconnection of said signal line.

20. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential device, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels, and a differential controller for controlling said actuator on the basis of said outputs of said operator-controlled input means and said vehicle condition detecting means;

a wheel rotation control device for controlling rotation of said controllable wheels;

differential state detecting means for generating an output indicative of an operating state of each of said at least one differential; and controller state determining means operated on the basis of said outputs of said differential state detecting means, said input means and said vehicle condition detecting means, for determining a state of said differential controller.

21. A control system according to claim 20, wherein said at least one differential includes a differential having a lock state in which differential actions of said controllable wheels are substantially completely inhibited, and a free state in which said differential actions are substantially completely permitted, and wherein said operator-controlled input means generates a first and a second output signal indicative of desires of the operator to select said lock and free states of said differential, respectively, said differential controller of said differential control device controlling said actuator to selectively place said differential in one of said lock and free states, depending upon said first and second output signals of said input means, said differential controller inhibiting an operation of said differential actuator to place said differential in said lock state even in the presence of said first output signal of said input means, if the condition of the vehicle as indicated by the output of said vehicle condition detecting means satisfies a predetermined condition, and wherein said controller state determining means determines whether said differential controller is inhibiting said differential actuator from operating to place said differential in said lock state.

22. A control system according to claim 20, wherein said controller state determining means determines whether there exists a possibility that said differential is in a process of shifting, under the control of said differential controller, from a free state in which differential actions of said controllable wheels are substantially completely permitted, to a lock state in which said differential actions are substantially completely inhibited.

23. A control system according to claim 20, further comprising a monitor which is connected to through a signal line to said differential state detecting means, for receiving an output signal of said differential state detecting means through said signal line, and wherein said controller state determining means is operated on the basis of an output of said monitor and said outputs of said input means and said vehicle condition detecting means, for determining whether there exists a possibility of electrical disconnection of said signal line.

24. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential device, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels, and a differential controller for controlling said actuator on the basis of said outputs of said operator-controlled input means and said vehicle condition detecting means;

a wheel rotation control device for controlling rotation of said controllable wheel, said wheel rotation control device including a plurality of brakes for braking said controllable wheels, respectively;

differential state detecting means for generating an output indicative of an operating state of each of said at least one differential; and wheel rotation control determining means for determining, on the basis of said outputs of said differential state detecting means, said input means and said vehicle condition detecting means, whether a normal operation of said wheel rotation control device in a predetermined normal manner should be permitted or inhibited.

25. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels, and a differential controller for controlling said actuator on the basis of said outputs of said operator-controlled input means and said vehicle condition detecting means;

a wheel rotation control device for controlling rotation of said controllable wheels, said wheel rotation control device including a plurality of brakes for braking said controllable wheels, respectively;

differential state detecting means for generating an output indicative of an operating state of each of said at least one differential; and normal operation inhibiting means for inhibiting, on the basis of said outputs of said differential state detecting means, said input means and said vehicle condition detecting means, at least one of a normal operation of said wheel rotation control device in a predetermined normal manner and a normal operation of said differential control device to control said differential in a predetermined normal manner, if said normal operation of said wheel rotation control device should be inhibited.

26. A control system for a motor vehicle having a plurality of wheels, comprising:

at least one differential for connecting a plurality of controllable wheels of said plurality of wheels of the vehicle, so as to permit differential actions of said controllable wheels;

a differential control device for controlling said at least one differential device, said differential control device including operator-controlled input means for generating an output indicative of a desire of an operator of the vehicle, vehicle condition detecting means for generating an output indicative of a condition of the vehicle, a differential actuator for operating said at least one differential to control the differential actions of said controllable wheels, and a differential controller for controlling said actuator on the basis of said outputs of said operator-controlled input means and said vehicle condition detecting means;

a wheel rotation control device for controlling rotation of said controllable wheels, said wheel rotation control device including a plurality of brakes for braking said controllable wheels, respectively;

differential state detecting means for generating an output indicative of an operating state of each of said at least one differential; and controller state determining means operated on the basis of said outputs of said differential state detecting means, said input means and said vehicle condition detecting means, for determining a state of said differential controller.

* * * * *

UNITED STATES PATENT AND TRADEMARK OFFICE
CERTIFICATE OF CORRECTION

PATENT NO. : 5,897,601
DATED : 27 April 1999
INVENTOR(S) : Tomokiyo SUZUKI

It is certified that error appears in the above-identified patent and that said Letters Patent is hereby corrected as shown below:

| Column | Line | |
|--------|------|---|
| 6 | 48 | Before "Where" start new paragraph. |
| 8 | 34 | Delete "the" (second occurrence). |
| 12 | 41 | After "flow" insert --through--. |
| 12 | 53 | Delete "it is correctly distinguish--. |
| 12 | 54 | After "state" delete "," and insert --is correctly distinguised--. |
| 15 | 31 | Change "respective" to --respectively--. |
| 15 | 41 | Change "signal" to --signals--. |
| 16 | 37 | Delete "for". |
| 17 | 6 | Change "differential.," to --differential,--. |

UNITED STATES PATENT AND TRADEMARK OFFICE
CERTIFICATE OF CORRECTION

PATENT NO. : 5,897,601
DATED : 27 April 1999
INVENTOR(S) : Tomokiyo SUZUKI

It is certified that error appears in the above-identified patent and that said Letters Patent is hereby corrected as shown below:

| Column | Line | |
|---|---|---|
| 19 | 1 | After "actions" insert --of--. |
| 19 | 5 | Change "IN" to --In--. |
| 19 | 7 | After "connected" delete "to". |
| 20 | 40 | Change "an poston" to --a piston--. |
| 22 | 15 | Change "ration" to --ratio--. |
| 22 | 27 | After "operated" insert --by--. |
| 22 | 31 | Change "Or" to --or--. |
| 22 | 44 | Change "support" to --supports--. |
| 23 | 10 | Change "dot clutch" to --dog clutch--. |
| 23 | 15 | Change "dot clutch" to --dog clutch--. |
| 23 | 52 | Before "vehicle" delete "the". |

UNITED STATES PATENT AND TRADEMARK OFFICE
CERTIFICATE OF CORRECTION

PATENT NO. : 5,897,601
DATED : 27 April 1999
INVENTOR(S) : Tomokiyo SUZUKI

It is certified that error appears in the above-identified patent and that said Letters Patent is hereby corrected as shown below:

| Column | Line | |
|---|---|---|
| 29 | 25 | After "employed" delete "is". |
| 29 | 34 | Change "OF" to --OFF--. |
| 33 | 53 | After "between" insert --the--. |
| 33 | 64 | Delete "25". |
| 35 | 7 | Change "a anti-" to -- an anti- --. |
| 35 | 23 | After "referred" insert --to--. |
| 35 | 25 | After "referred" insert --to--. |
| 35 | 65 | Change "wand" to --and--. |
| 38 | 7 | Change "therefore" to --Therefore--. |
| 40 | 37 | Delete "primary deter-". |

UNITED STATES PATENT AND TRADEMARK OFFICE
CERTIFICATE OF CORRECTION

PATENT NO. : 5,897,601
DATED : 27 April 1999
INVENTOR(S) : Tomokiyo SUZUKI

It is certified that error appears in the above-identified patent and that said Letters Patent is hereby corrected as shown below:

| Column | Line | |
|--------|------|---|
| 40 | 38 | Delete "mines that". |
| 41 | 46 | Change "determine" to --determining--. |
| 44 | 55 | After "wheels" insert --,--. |
| 44 | 65 | Change "one the basis" to --on the basis--. |
| 44 | 67 | After "means" insert --,--. |
| 45 | 61 | Change "pr signal" to --primary signal--. |
| 47 | 13 | Change "indication" to --indicated--. |
| 47 | 36 | Delete "said". |
| 48 | 43 | Before "through" delete "to". |

Signed and Sealed this

Fifteenth Day of August, 2000

Q. TODD DICKINSON

Attest:

Attesting Officer

Director of Patents and Trademarks